US007908733B2

(12) United States Patent
Miyagawa et al.

(10) Patent No.: US 7,908,733 B2
(45) Date of Patent: Mar. 22, 2011

(54) METHOD FOR MANUFACTURING INJECTION HOLE MEMBER

(75) Inventors: Masanori Miyagawa, Kariya (JP); Tsunehiro Uehara, Suwa (JP)

(73) Assignees: Denso Corporation, Kariya (JP); Komatsuseiki Kosakusho Co., Ltd, Suwa (JP)

( * ) Notice: Subject to any disclaimer, the term of this patent is extended or adjusted under 35 U.S.C. 154(b) by 225 days.

(21) Appl. No.: 12/230,787

(22) Filed: Sep. 4, 2008

(65) Prior Publication Data

US 2009/0007411 A1 Jan. 8, 2009

Related U.S. Application Data

(62) Division of application No. 10/746,262, filed on Dec. 29, 2003, now abandoned.

(30) Foreign Application Priority Data

Dec. 27, 2002 (JP) ................................ 2002-381501
Dec. 27, 2002 (JP) ................................ 2002-381687
Dec. 27, 2002 (JP) ................................ 2002-381753
Nov. 14, 2003 (JP) ................................ 2003-385684

(51) Int. Cl.
*B23P 13/04* (2006.01)
*F02M 59/00* (2006.01)

(52) U.S. Cl. .................. 29/557; 239/533.2; 239/533.13; 29/890.132

(58) Field of Classification Search .................... 29/557, 29/890.132; 239/533.2, 533.12
See application file for complete search history.

(56) References Cited

U.S. PATENT DOCUMENTS 5,092,039 A * 3/1992 Gaskell .................... 29/890.142
5,626,295 A * 5/1997 Heyse et al. .................. 239/596
5,934,571 A 8/1999 Schmidt et al.
6,131,827 A * 10/2000 Kurita et al. ............... 239/533.2
6,439,484 B2 * 8/2002 Harata et al. .................. 239/596
6,678,955 B2 1/2004 Takeshita et al.
6,948,665 B2 * 9/2005 Joseph ....................... 239/533.2
6,991,188 B2 * 1/2006 Kobayashi et al. ........... 239/596

(Continued)

FOREIGN PATENT DOCUMENTS

JP 7-127550 5/1995

(Continued)

OTHER PUBLICATIONS

JPO Examination Report (with English translation) dated Mar. 13, 2007.

(Continued)

*Primary Examiner* — David P Bryant
*Assistant Examiner* — Jacob J Cigna
(74) *Attorney, Agent, or Firm* — Nixon & Vanderhye PC

(57) ABSTRACT

A lead hole is formed in a base material of an injection hole member with a straight punch, and then, a taper hole is formed in the base material by widening the lead hole with a taper punch. An intersection line between a virtual plane perpendicular to a central axis of the lead hole and an inner peripheral surface of the lead hole is elliptic in shape, whose major axis is directed along an intersection line between a virtual plane, which includes the central axis of the lead hole and a thickness direction axis of the base material, and the virtual plane perpendicular to the central axis of the lead hole. An intersection line between a virtual plane perpendicular to a central axis of the taper punch and an outer peripheral surface of the taper punch is round in shape.

8 Claims, 31 Drawing Sheets

U.S. PATENT DOCUMENTS

| | | | | |
|---|---|---|---|---|
| 7,003,880 | B2 * | 2/2006 | Morita | 29/890.142 |
| 2002/0020766 | A1 * | 2/2002 | Kobayashi et al. | 239/533.2 |
| 2002/0038825 | A1 * | 4/2002 | Takeshita et al. | 239/585.1 |
| 2003/0165621 | A1 * | 9/2003 | Farmer et al. | 427/331 |
| 2004/0163254 | A1 | 8/2004 | Miyagawa et al. | |
| 2006/0026264 | A1 * | 2/2006 | Chesley et al. | 709/218 |
| 2008/0105767 | A1 | 5/2008 | Fujii et al. | |

FOREIGN PATENT DOCUMENTS

| | | | |
|---|---|---|---|
| JP | 2000-52157 | | 2/2000 |
| JP | 2000052157 A | * | 2/2000 |
| JP | 2001-214839 | | 8/2001 |
| JP | 2001-263201 | | 9/2001 |
| JP | 2002-54533 A | | 2/2002 |
| JP | A-2002-102977 | | 4/2002 |
| JP | 2006-105067 | | 4/2006 |
| JP | 2006-200378 | | 8/2006 |

OTHER PUBLICATIONS

Japanese Examination Report mailed Jul. 13, 2007 in Application No. 2003-385684 with English translation.

JPO Examination Report for JP2003-385684, counterpart of U.S. Appl. No. 10/746,262.

JPO Examination Report for JP2003-381687, counterpart of U.S. Appl. No. 10/746,262.

* cited by examiner

METHOD FOR MANUFACTURING INJECTION HOLE MEMBER

CROSS REFERENCE TO RELATED APPLICATION

This application is a division of application Ser. No. 10/746,262, filed Dec. 29, 2003, which is in turn based on Japanese Patent Application Nos. 2002-381501 filed on Dec. 27, 2002, No. 2002-381687 filed on Dec. 27, 2002, No. 2002-381753 filed on Dec. 27, 2002 and No. 2003-385684 filed on Nov. 14, 2003, the disclosures of which are incorporated herein by reference.

BACKGROUND OF THE INVENTION

1. Field of the Invention

The present invention relates to an injection hole member formed with an injection hole for injecting fluid and to a method for manufacturing the injection hole member. For instance, the present invention relates to an injection hole member of a fuel injection device and to a suitable method for manufacturing the injection hole member of the fuel injection device.

2. Description of Related Art

Conventionally, as disclosed in Japanese Patent Unexamined Publication No. 2002-102977 (patent document 1), an injection hole member formed with an injection hole provided by a taper hole is known. A central axis of the taper hole is inclined with respect to an axis of the injection hole member in its thickness direction, and the internal diameter of the taper hole increases from an upstream end toward a downstream end of the injection hole member.

In the patent document 1, the taper hole used as the injection hole is formed through punch press. Specifically, a taper punch, whose diameter decreases toward its tip end, is used. The tip end of the taper punch is driven into a base material of the injection hole member. Thus, the taper hole is formed along an outer peripheral surface of the taper punch.

The tip end of the taper punch is pressed against an end surface of the base material in order to form the taper hole in one time of the punch press. In this case, a distance between a pressing portion and a held portion of the taper punch is long. As a result, bending moment applied to the taper punch is increased and the taper punch becomes prone to break.

Therefore, as shown in FIG. 38A, a method of forming the taper hole with the use of a lead hole 2 formed in the base material 1 in advance can be employed. More specifically, the lead hole 2 is formed in the base material 1 in advance so that a central axis O of the lead hole 2 is inclined with respect to an axis T of the base material 1 in its thickness direction and the internal diameter of the taper hole 2 is substantially constant along its central axis O. Then, a taper punch 6 is driven into the base material 1 in a state in which a central axis P of the taper punch 6 is inclined substantially in the same direction as the central axis O of the lead hole 2. At that time, the taper hole is formed by widening the lead hole 2 with the taper punch 6. When the tip end of the taper punch 6 is entered into the lead hole 2, the taper punch 6 can press an edge of the opening of the lead hole 2 at a position closer to the held portion of the taper punch 6 than the tip end of the taper punch 6. Thus, the distance between the pressing portion and the held portion of the taper punch 6 is contracted. Therefore, the bending moment applied to the taper punch 6 is reduced compared to the case where the taper hole is formed in the one time of the punch press.

In the method shown in FIG. 38A, a line of intersection between a virtual plane Z, which is perpendicular to the central axis O of the lead hole 2 and the central axis P of the taper punch 6, and an inner peripheral surface 2*a* of the lead hole 2 is round in shape as shown in FIG. 38B. Meanwhile, another intersection line between the virtual plane Z and an outer peripheral surface 6*a* of the taper punch 6 is round in shape as shown in FIG. 38B. Therefore, an intersection line between a virtual plane H perpendicular to the axis T of the base material 1 in its thickness direction and the inner peripheral surface 2*a* of the lead hole 2 is elliptic in shape as shown in FIG. 38C. Meanwhile, another intersection line between the virtual plane H and the outer peripheral surface 6*a* of the taper punch 6 is elliptic in shape as shown in FIG. 38C. The ratio between a major axis and a minor axis of the former elliptic intersection line is substantially the same as the ratio between a major axis and a minor axis of the latter elliptic intersection line as shown in FIG. 38C. Therefore, in the early stage of the punch press, as shown in FIG. 38C, the taper punch 6 contacts the edge of the opening of the lead hole 2 at one point on a virtual plane L including the central axis O of the lead hole 2, the central axis P of the taper punch 6 and the thickness direction axis T of the base material 1. The contact at the one point inhibits the decrease of the bending moment applied to the taper punch 6. Therefore, the effect of preventing the breakage of the taper punch 6 cannot be improved.

Moreover, in the case where the taper hole is formed in the base material through the punch press, an area of the opening of the taper hole depends on a stroke of the punch in the pressing direction. A flow rate defined by the injection hole provided by the taper hole depends on the opening area of a smaller diameter opening of the taper hole. Accordingly, the flow rate defined by the injection hole will vary because of the variation in the opening area due to the punch stroke. As a result, injection quantity of the fluid will vary.

A technology for forming the injection hole in a plate-like injection hole member of a fluid injection valve in order to improve designing flexibility of the shape of the injection hole and the like is disclosed in Japanese Patent Unexamined Publication No. 2000-52157. In this technology, an axis of the injection hole is inclined with respect to a central axis of the injection hole member. A plurality of injection holes is formed in respective injection directions so that the plurality of injection holes is directed away from each other along respective injection directions.

In the injection hole member formed with the injection holes whose axes are inclined with respect to the central axis of the injection hole member, an injection angle of spray injected from the injection holes can be regulated if necessary. In the case where the spray is injected from the plurality of injection holes in one direction, a widening angle of the entire spray can be regulated by adjusting injection angles of the respective injection holes. In the case where the spray is injected from the plurality of injection holes in two directions, a widening angle between the two directions of the injected spray can be regulated by adjusting injection angles of the respective injection holes.

However, the injection angle can vary for each injection hole member because of deviation of an injection angle of the injection hole axis with respect to the central axis of the injection hole member, variation in the thickness of the injection hole member or the like.

SUMMARY OF THE INVENTION

It is therefore an object of the present invention to prevent breakage of a taper punch when a taper hole, which provides as at least a part of an injection hole, is formed through punch press.

It is another object of the present invention to provide a method for manufacturing an injection hole member capable of inhibiting product variation in a flow rate defined by an injection hole.

It is yet another object of the present invention to provide an injection hole member capable of easily regulating a spray angle and a method for manufacturing the injection hole member.

According to an aspect of the present invention, a virtual plane perpendicular to a central axis of a lead hole is defined as a first reference plane, and another virtual plane perpendicular to a central axis of a taper punch is defined as a second reference plane. An intersection line between a virtual plane, which includes the central axis of the lead hole and an axis of a base material in its thickness direction, is defined as a reference axis. In this case, an intersection line between the first reference plane and an inner peripheral surface of lead hole is an elliptic shape or an oval shape, whose major diameter is directed in an extending direction of the reference axis. An intersection line between the second reference plane and an outer peripheral surface of the taper punch is round in shape. Therefore, in an early stage of punch press in a taper hole forming step, the taper punch can contact an edge of an opening of the lead hole at two points on both sides of a virtual plane, which includes the central axes of the lead hole and the taper punch and the thickness direction axis of the base material. Thus, the bending moment applied to the taper punch can be reduced, so breakage of the taper punch can be prevented.

According to another aspect of the present invention, a taper hole, whose internal diameter increases from an end surface toward the other end surface of a base material, is formed in the base material through punch press. Then, a straight hole is formed by widening a smaller diameter opening of the taper hole through punch press. An inner peripheral surface of the straight hole connects to an inner peripheral surface of the remaining taper hole. Thus, the smaller diameter opening of the taper hole, whose opening area is prone to vary depending on a punch stroke, can be changed into the straight hole, whose opening area is almost independent of the punch stroke. As a result, variation in a flow rate defined by an injection hole provided by the taper hole and the straight hole or variation among products in injection quantity of fluid injected from the injection hole can be reduced.

According to yet another aspect of the present invention, a concave portion is formed in an edge of a downstream end opening of an injection hole so that the concave portion caves in radially outward from an inner peripheral surface, which provides the injection hole. Accordingly, length of a flow of fluid guided by the inner peripheral surface of the injection hole can be regulated. An injection angle of spray injected from the injection hole can be easily regulated by changing the size of the concave portion. The concave portion is formed in the edge of the downstream end opening of the injection hole, not in an edge of an upstream end opening of the injection hole. Therefore, a change in a flow rate of the fluid flowing into the injection hole, or a change in injection quantity of the fluid injected from the injection hole, can be reduced.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS

First Embodiment

Figure 2:
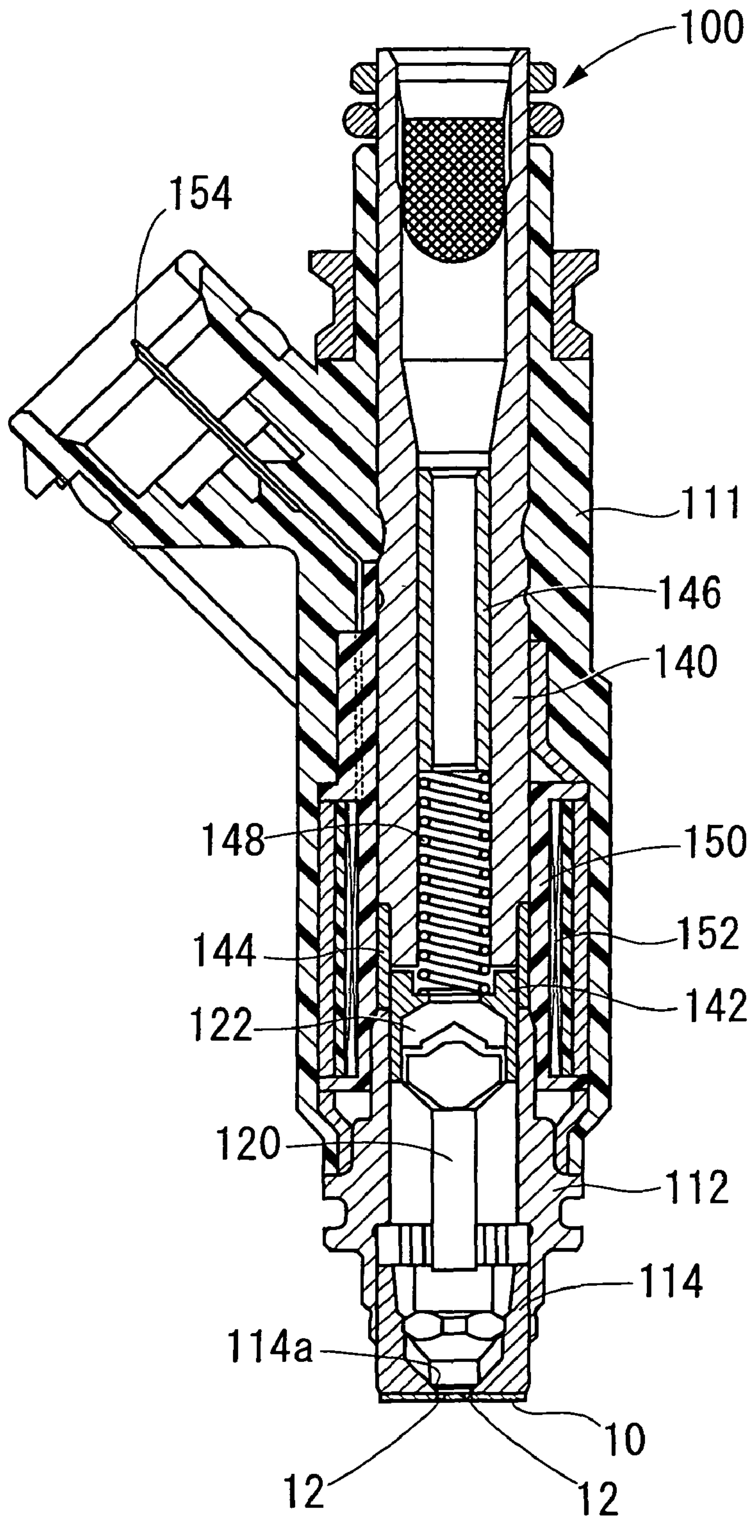
FIG. 2 is a diagram showing a fuel injection device having an injection hole member manufactured through the method according to the first embodiment.

Referring to FIG. 2, a fuel injection device 100 having an injection hole member manufactured through a method according to the first embodiment of the present invention is illustrated. The fuel injection device 100 shown in FIG. 2 is applied to a gasoline engine.

A casing 111 is molded resin for covering a magnetic pipe 112, a fixed core 140, a coil 152 wound around a spool 150 and the like. A valve body 114 is connected to the magnetic pipe 112 through laser welding and the like. A nozzle needle 120 as a valve member can be seated on a valve seat 114*a* formed on an inner peripheral surface of the valve body 114. An injection hole member 10 is fixed to an external wall of a bottom portion of the valve body 114 through the laser welding and the like. A plurality of injection holes 12 is formed in the injection hole member 10. If the nozzle needle 120 separates from the valve seat 114*a*, the fuel is injected through the respective injection holes 12. If the nozzle needle 120 is seated on the valve seat 114*a*, the fuel injection from the respective injection holes 12 is stopped. A connecting portion 122 disposed on a side of the nozzle needle 120 opposite from the valve seat 114*a* is connected with a movable core 142. The nozzle needle 120 reciprocates integrally with the movable core 142. The fixed core 140 is connected with a non-magnetic pipe 144 through the laser welding and the like. The non-magnetic pipe 144 is connected with the magnetic pipe 112 through the laser welding and the like. A spring 148 is disposed on a side of an adjusting pipe 146 on the injection hole 12 side for biasing the movable core 142 and the nozzle needle 120 toward the valve seat 114*a*. The biasing force of the spring 148 biasing the nozzle needle 120 can be regulated by changing the axial position of the adjusting pipe 146. The coil 152 wound around the spool 150 is disposed in the casing 111 so that the coil 152 surrounds the respective ends of the fixed core 140 and the magnetic pipe 112, which sandwich the non-magnetic pipe 144, and a periphery of the non-magnetic pipe 144. The coil 152 is electrically connected with a terminal 154. Voltage applied to the terminal 154 is applied to the coil 152. If energization to the coil 152 is turned on, the movable core 142 is attracted toward the fixed core 140 by magnetic force, against the biasing force of the spring 148. If the energization to the coil 152 is turned off, the movable core 142 is separated from the fixed core 140 by the biasing force of the spring 148 and the nozzle needle 120 is seated on the valve seat 114*a*.

Next, the injection hole member 10 manufactured through the method according to the first embodiment will be explained in detail based on FIGS. 3A and 3B.

The injection hole member 10 is manufactured by forming the injection holes 12 in a base material 11, which is formed of metallic material such as aluminum in the shape of a flat plate. Each injection hole 12 is provided by a taper hole in the shape of a cone. A central axis $O_t$ of the taper hole is inclined with respect to the axis T of the base material 11 in its thickness direction, and an inner diameter of the taper hole increases from an upstream end surface 11*a* toward a downstream end surface 11*b* of the base material 11 as shown in FIG. 3A. A smaller diameter end of the injection hole 12 opens into the upstream end surface 11*a* of the base material 11. A larger diameter end of the injection hole 12 opens into the downstream end surface 11*b* of the base material 11. Thus, diameters of fuel spray can be minimized. Closed curves among intersection lines between a virtual plane $Q_t$, which is perpendicular to the central axis $O_t$, and the inner peripheral surface 12*a* of the injection hole 12 are round in shape as shown in FIG. 3B. Two intersection lines C1, C2 between a virtual plane L, which includes the central axis $O_t$ of the injection hole 12 and the thickness direction axis T of the base material 11, and the inner peripheral surface 12*a* of the injection hole 12 are inclined to the same side with respect to the thickness direction axis T of the base material 11 as shown in FIG. 3A. As shown in FIG. 3A, an inclination angle θ1 provided between the intersection line C1 and the thickness direction axis T of the base material 11 is more acute than another inclination angle θ2 provided between the intersection line C2 and the thickness direction axis T of the base material 11.

Next, the method for manufacturing the injection hole member 10 according to the first embodiment will be explained based on FIG. 4.

Figure 4:
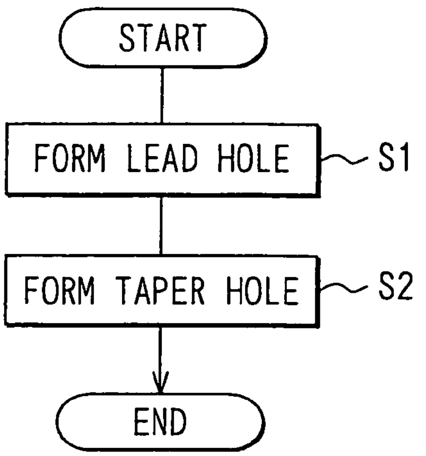
FIG. 4 is a flowchart showing a method for manufacturing the injection hole member according to the first embodiment.
Figure 5A:
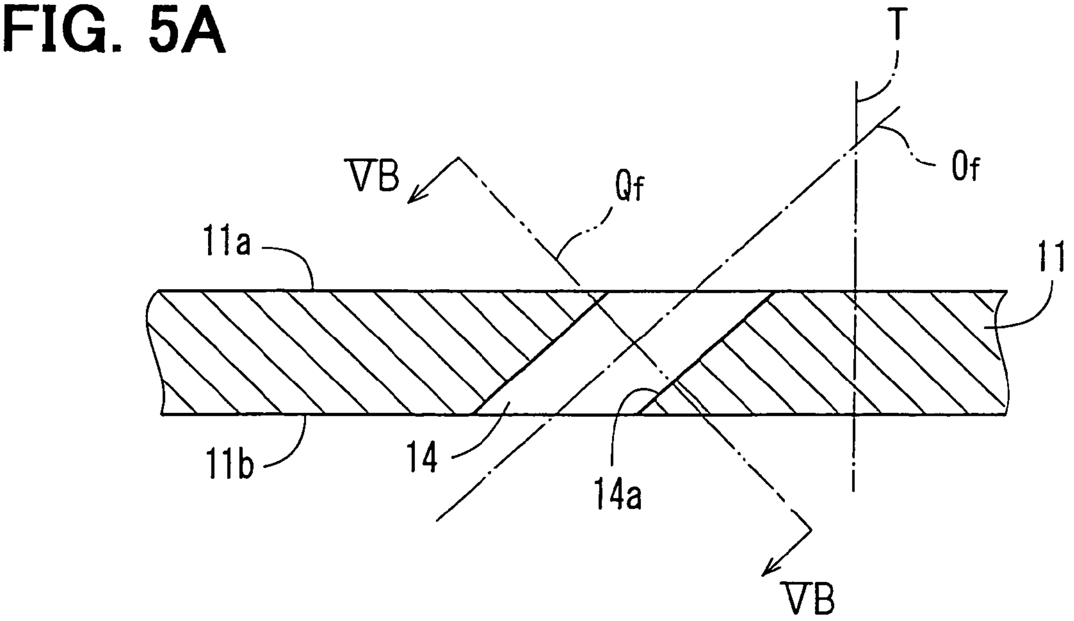
FIG. 5A is a cross-sectional view showing a base material formed with a lead hole according to the first embodiment.
Figure 5B:
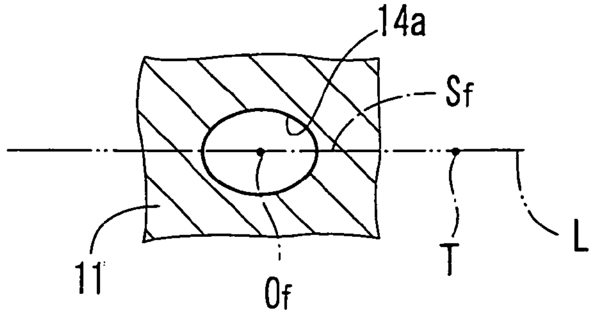
FIG. 5B is a cross-sectional view showing the base material of FIG. 5A taken along the line Vb-Vb.

First, in Step S1 of a flowchart shown in FIG. 4, a lead hole 14 is formed in the base material 11 in the shape of a flat plate through punch press as shown in FIGS. 5A and 5B. Specifically, a lead hole forming machine 20 having a punch 21, a die 24 and a guide 26 shown in FIG. 6A is used to form the lead hole 14.

In the lead hole forming machine 20, the die 24 and the guide 26 hold the base material 11 therebetween. The die 24 contacts the downstream end surface 11*b* and the guide 26 contacts the upstream end surface 11*a* of the base material 11. The punch 21 is formed in the shape of a circular cylinder, whose diameter is substantially constant in an extending direction of its central axis $P_f$. An intersection line between a virtual plane $R_f$, which is perpendicular to the central axis $P_f$ of the punch 21, and an outer peripheral surface 22*a*, 23*a* of the punch 21 is elliptic in shape. The direction of the major axis of the elliptic shape coincides with an extending direction of an intersection line $U_f$ between the virtual plane L, which includes the thickness direction axis T of the base material 11 and the central axis $P_f$ of the punch 21, and the virtual plane $R_f$. A processing portion 22 is formed on a tip end side of the punch 21. The punch 21 is formed with a held portion 23 on a side opposite from the processing portion 22. The punch 21 is inserted into a guide hole 27 of the guide 26 and is held by an inner peripheral surface 27*a* of the guide hole 27, which slidably contacts at least the outer peripheral surface 23*a* of the held portion 23 throughout the periphery. Thus, the central axis $P_f$ of the punch 21 is inclined with respect to the thickness direction axis T of the base material 11, which is held between the die 24 and the guide 26. Thus, the punch 21 is guided along the extending direction of the central axis $P_f$. The punch 21, which has punched a hole in the base material 11, is slidably inserted into a pulling cavity 25 of the die 24.

Figure 6A:
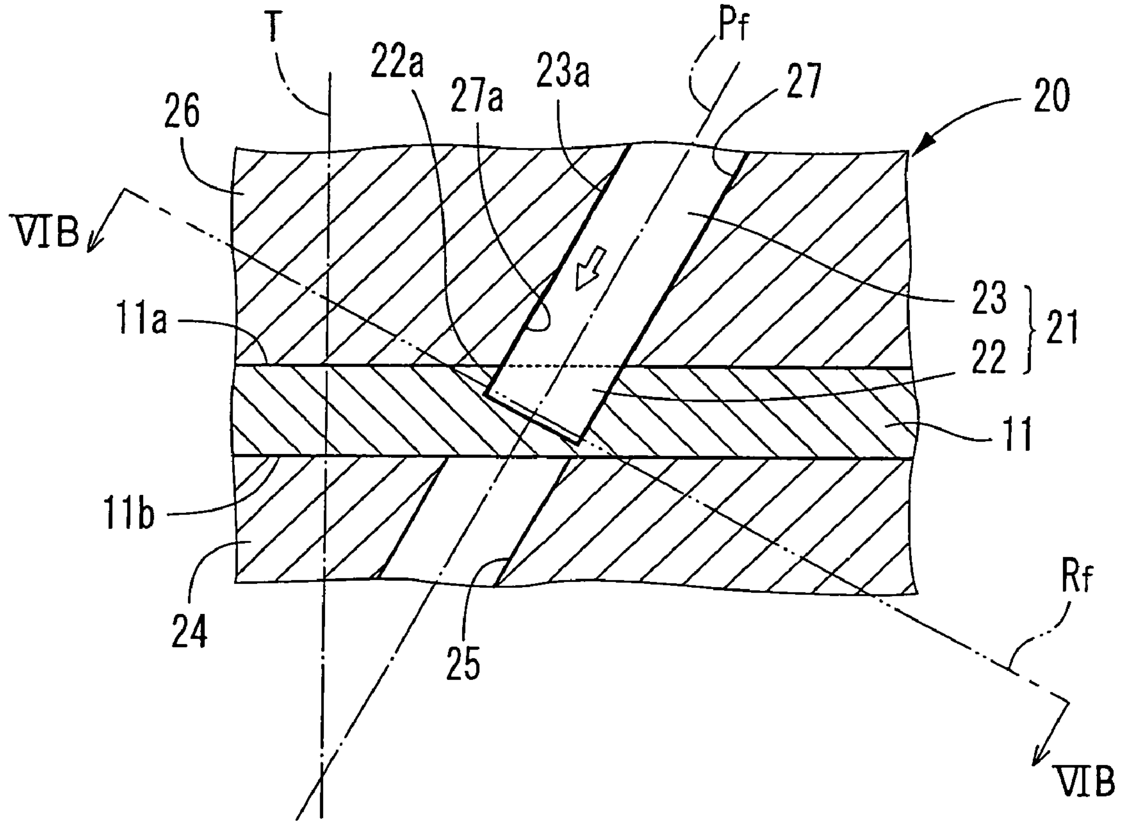
FIG. 6A is a cross-sectional view showing a lead hole forming machine according to the first embodiment.
Figure 6B:
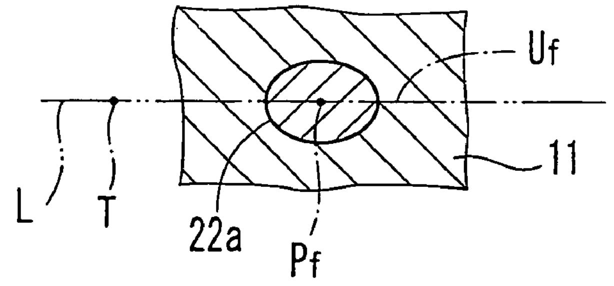
FIG. 6B is a cross-sectional view showing the lead hole forming machine of FIG. 6A taken along the line VIB-VIB.

In order to form the lead hole 14 by using the lead hole forming machine 20, the processing portion 22 is driven into the base material 11 by moving the punch 21 in the pressing direction from the upstream end surface 11*a* toward the downstream end surface 11*b* of the base material 11 along the central axis $P_f$ of the punch 21 as shown by an arrow mark in FIG. 6A. Thus, the lead hole 14 is punched in the base material 11 by the processing portion 22, so the lead hole 14 is formed in the shape complementing the outer peripheral surface 22*a* of the processing portion 22. More specifically, the lead hole 14 is formed in a cylindrical shape whose diameter is substantially constant in an extending direction of its central axis $O_f$ as shown in FIG. 5A. In the thus formed lead hole 14, closed curves among the intersection lines between a virtual plane $Q_f$, which is perpendicular to the central axis $O_f$ the lead hole 14 inclined with respect to the thickness direction axis T of the base material 11, and the inner peripheral surface 14*a* of the lead hole 14 are elliptic in shape. The direction of the major axis of the elliptic shape coincides with the extending direction of an intersection line $S_f$ between the virtual plane L, which includes the axes $O_f$, T, and the virtual plane $Q_f$.

Figure 3A:
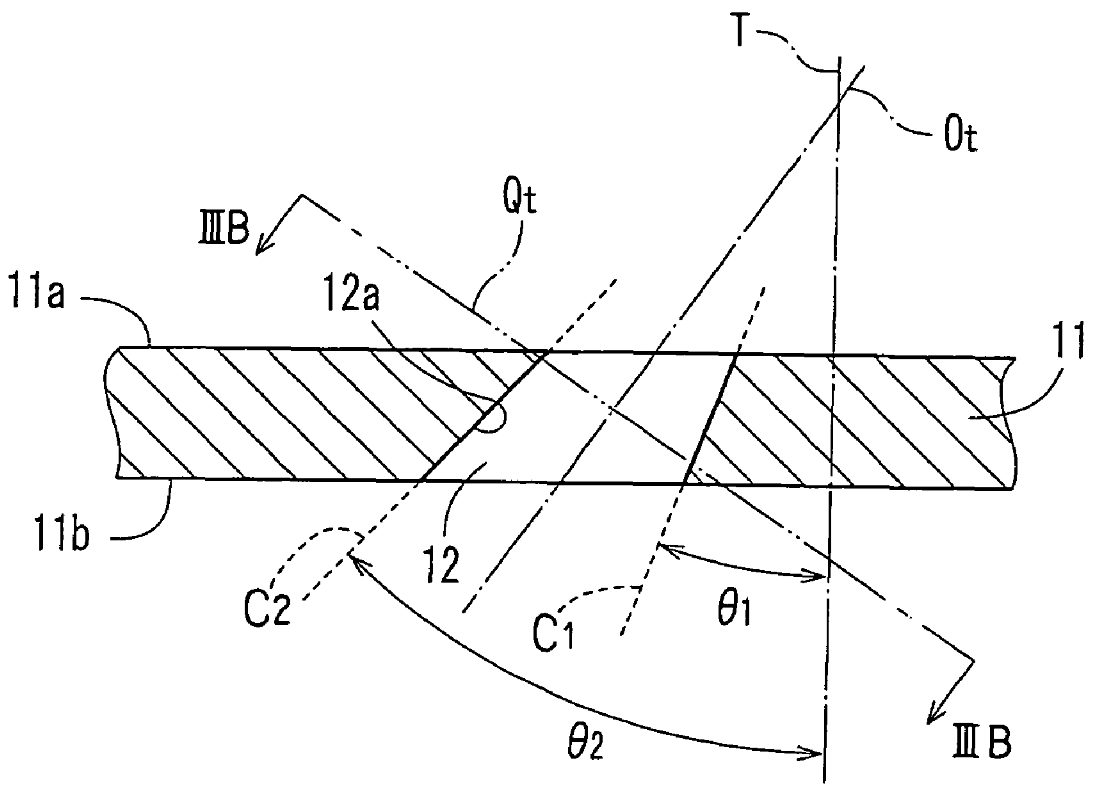
FIG. 3A is a cross-sectional view showing an injection hole member manufactured through the method according to the first embodiment of the present invention.
Figure 3B:
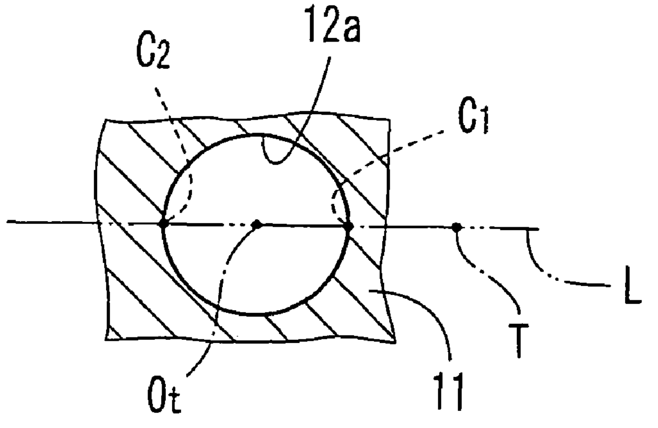
FIG. 3B is a cross-sectional view showing the injection hole member of FIG. 3A taken along the line IIIB.

Then, the taper hole 12, which provides the injection hole 12 shown in FIGS. 3A and 3B, is formed in the base material 11 through the punch press in Step S2 of the flowchart shown in FIG. 4. More specifically, a taper hole forming machine 30 having a punch 31, a die 34 and a guide 36 shown in FIGS. 1A to 1C is used to form the taper hole 12.

In the taper hole forming machine 30, the die 34 and the guide 36 contact the upstream end surface 11*a* and the downstream end surface 11*b* of the base material 11 respectively, so that the die 34 and the guide 36 hold the base material 11 therebetween. The punch 31 is formed with a processing portion 32 on its tip end side and a held portion 33 on a side opposite from the processing portion 32. The processing portion 32 is formed in the shape of a truncated cone whose diameter decreases toward its tip end along the extending direction of its central axis $P_t$. An intersection line between a virtual plane $R_t$, which is perpendicular to the central axis $P_t$ of the processing portion 32, and an outer peripheral surface 32*a* of the processing portion 32 is round in shape. The tip end of the processing portion 32 is formed to be smaller than the opening of the lead hole 14 and the other end of the processing portion 32 on the held portion 33 side is formed to be larger than the opening of the lead hole 14. The held portion 33 is formed in a cylindrical shape, whose diameter is substantially constant along the extending direction of the same central axis $P_t$ as the processing portion 32.

The processing portion 32 and the held portion 33 are inserted into a guide hole 37 of the guide 36. The held portion 33 is held by an inner peripheral surface 37*a* of the guide hole 37, which slidably contacts an outer peripheral surface 33*a* of the held portion 33 throughout the periphery. Thus, the punch 31 is held so that the central axis $P_t$ of the punch 31 is inclined to the same side as the central axis $O_f$ the lead hole 14 formed in the base material 11, with respect to the thickness direction axis T of the base material 11 held between the die 34 and the guide 36. Meanwhile, the central axis $P_t$ of the punch 31 is parallel to the central axis $O_f$ the lead hole 14. More specifically, the angle of the inclination of the central axis $P_t$ with respect to the axis T substantially coincides with the angle of the inclination of the central axis $O_f$ with respect to the axis T. Two intersection lines B1, B2 provided by the virtual plane L, which includes the thickness direction axis T of the base material 11, the central axis $P_t$ of the punch 31 and the central axis $O_f$ the lead hole 14, and the outer peripheral surface 32*a* of the processing portion 32 are inclined to the same side with respect to the thickness direction axis T of the base material 11. In the present embodiment, the angle of the inclination of the intersection line B1 with respect to the thickness direction axis T is set to the same angle as the above angle θ1, and the angle of the inclination of the intersection line B2 with respect to the thickness direction axis T is set to the same angle as the above angle θ2. The guide 36 guides the held portion 33 of the punch 31, so the punch 31 can move in the extending direction of the central axis $P_t$. The punch 31, which has punched the taper hole 12 in the base material 11, is slidably inserted into a pulling cavity 35 of the die 34.

Figure 1A:
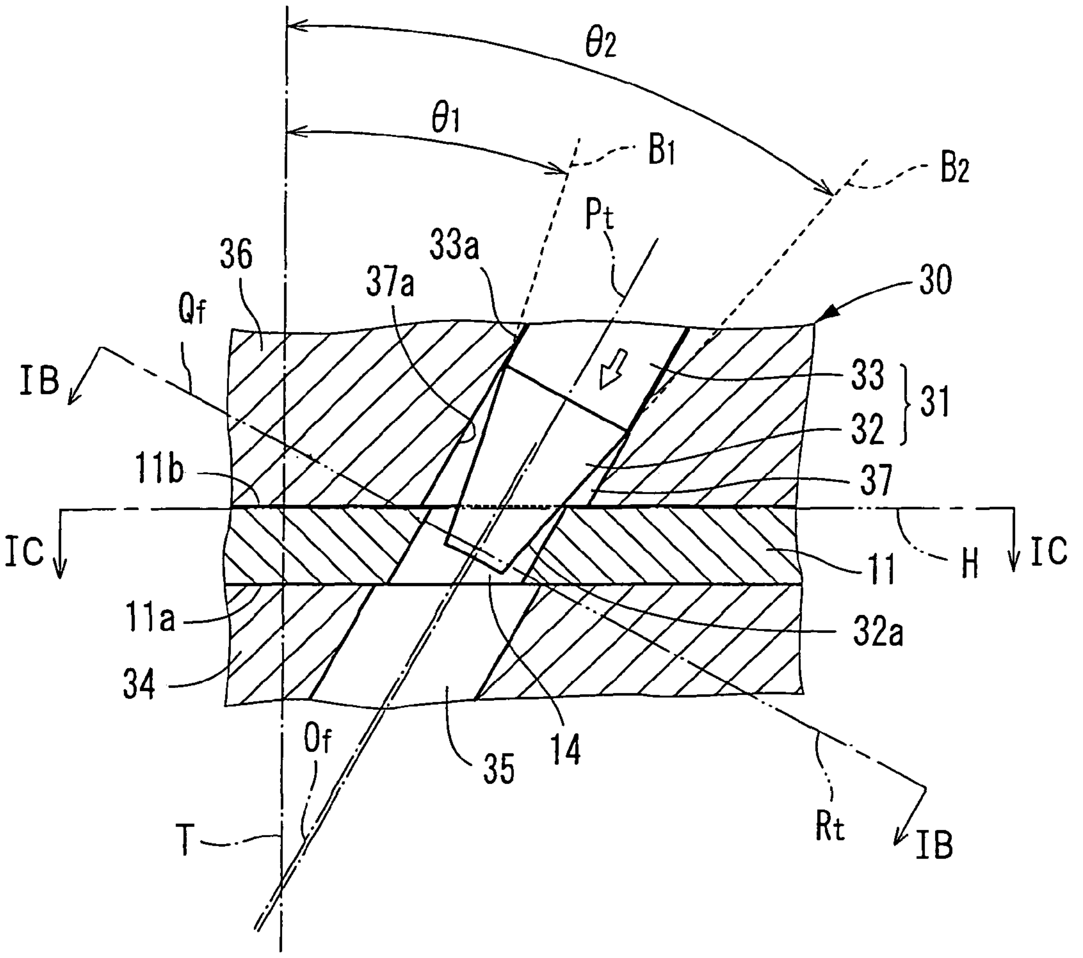
FIG. 1A is a cross-sectional view showing a taper hole forming machine according to a first embodiment of the present invention.
Figure 1B:
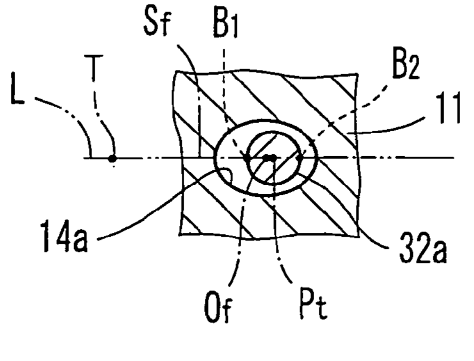
FIG. 1B is a cross-sectional view showing the taper hole forming machine of FIG. 1A taken along the line IB.
Figure 1C:
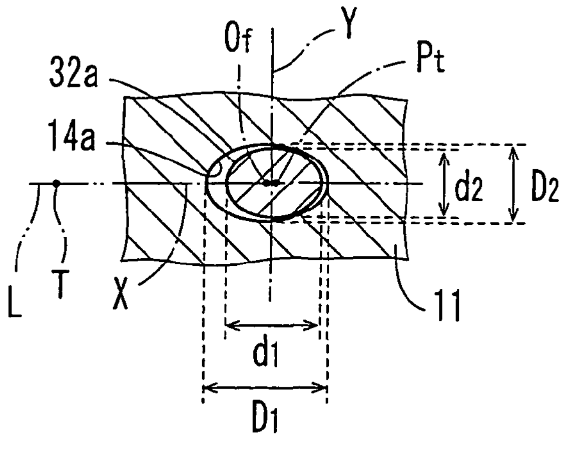
FIG. 1C is a cross-sectional view showing the taper hole forming machine of FIG. 1A taken along the line IC.

In order to form the taper hole 12 by using the taper hole forming machine 30, the punch 31 is moved in a direction for entering the tip end of the processing portion 32 into the lead hole 14 from the downstream end surface 11*b* of the base material 11 along the central axis $P_t$ as shown by an arrow mark in FIG. 1A. More specifically, in the present embodiment, the punch 31 is moved in a pressing direction from the downstream end surface 11*b* to the upstream end surface 11*a* of the base material 11, or in a direction opposite to the pressing direction in Step S1. As the punch 31 is moved, the processing portion 32 is driven into the base material 11. More specifically, the tip end of the processing portion 32 is inserted into the lead hole 14 and the processing portion 32 contacts the edge of the opening of the lead hole 14. Then, the processing portion 32 widens the lead hole 14 with the outer peripheral surface 32*a*. The processing portion 32 of the punch 31 keeps widening the lead hole 14 until the processing portion 32 punches out the base material 11. Thus, the taper hole 12 is shaped into a shape complementing the shape of the outer peripheral surface 32*a* of the processing portion 32. More specifically, as shown in FIG. 3A, the taper hole 12 is formed in the shape of a conical hole, whose internal diameter increases along the direction from the upstream end surface 11*a* toward the downstream end surface 11*b* of the base material 11 in the extending direction of the central axis $O_t$ of the taper hole 12. In the taper hole 12, closed curves among intersection lines between a virtual plane $Q_t$, which is perpendicular to the central axis $O_t$, and the inner peripheral surface 12*a* of the taper hole 12 are round in shape. In the present embodiment, the pressing direction in Step S2 is set to be opposite from the pressing direction in Step S1. Therefore, even if burrs are formed at the front edge of the opening of the lead hole 14 in the pressing direction in Step S1, the edge of the opening can be formed finely by widening the edge with the larger diameter end portion of the processing portion 32.

Next, functions and effects of the method according to the first embodiment will be explained based on FIGS. 1A to 1C.

In the state where the base material 11 is disposed between the die 34 and the guide 36 of the taper hole forming machine 30 in Step S2, a virtual plane H perpendicular to the thickness direction axis T of the base material 11 is defined as a coordinate plane H. An intersection line X between the virtual plane L, which includes the central axis $O_f$ the lead hole 14, the central axis $P_t$ of the processing portion 32 and the thickness direction axis T of the base material 11, and the coordinate plane H is defined as a first coordinate axis X. A line Y perpendicular to the first coordinate axis X on the coordinate plane H is defined as a second coordinate axis Y.

In the first embodiment, in the state where the base material 11 is disposed between the die 34 and the guide 36 of the taper hole forming machine 30, the intersection line between the coordinate plane H and the inner peripheral surface 14*a* of the lead hole 14 and the intersection line between the coordinate plane H and the outer peripheral surface 32*a* of the processing portion 32 are elliptic in shape as shown in FIG. 1C. The major axis of each elliptic shape is directed in the extending direction of the first coordinate axis X as shown in FIG. 1C. In FIG. 1C, a diameter d1 represents a diameter of the intersection line between the coordinate plane H and the outer peripheral surface 32*a* of the processing portion 32 along the first coordinate axis X. A diameter d2 represents a diameter of the intersection line between the coordinate plane H and the outer peripheral surface 32*a* of the processing portion 32 along the second coordinate axis Y. A diameter D1 represents a diameter of the intersection line between the coordinate plane H and the inner peripheral surface 14*a* of the lead hole 14 along the first coordinate axis X. A diameter D2 represents a diameter of the intersection line between the coordinate plane H and the inner peripheral surface 14*a* of the lead hole 14 along the second coordinate axis Y. In the first embodiment, a ratio of the diameter d1 to the diameter d2 (a ratio d1/d2) of the intersection line between the coordinate plane H and the outer peripheral surface 32*a* of the processing portion 32 is less than a ratio of the diameter D1 to the diameter D2 (a ratio D1/D2) of the intersection line between the coordinate plane H and the inner peripheral surface 14*a* of the lead hole 14. Therefore, in the early stage of the punch press in Step S2, the processing portion 32 can contact two points of the edge of the opening of the lead hole 14 on both sides of the virtual plane L, which includes the axes $O_f$, $P_t$, T. Thus, the bending moment, which is generated by the force applied by the edge of the opening of the lead hole 14 to the processing portion 32 of the punch 31 held at the held portion 33, can be reduced compared to the case where the punch 31 is held at a point. As a result, the breakage of the punch 31 can be surely prevented.

Second Embodiment

Next, a method for forming the injection hole by using a lead hole forming machine and a taper hole forming machine according to the second embodiment will be explained based on FIGS. 7A to 9C.

Figure 7A:
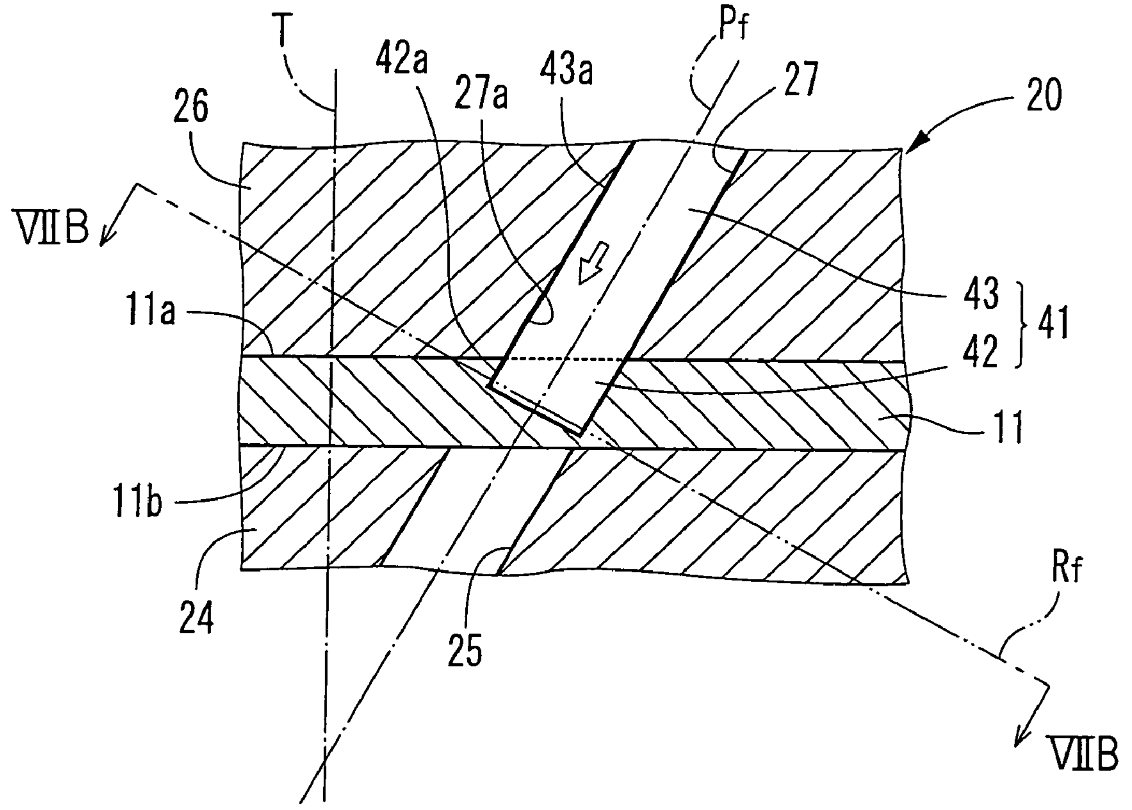
FIG. 7A is a cross-sectional view showing a lead hole forming machine according to a second embodiment of the present invention.
Figure 7B:
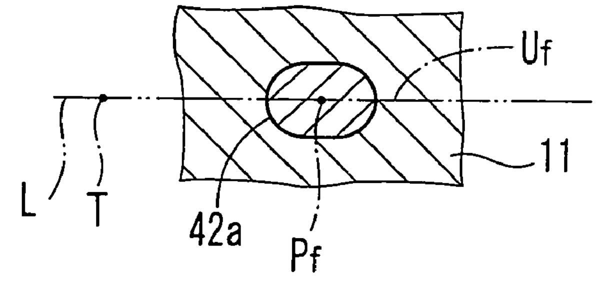
FIG. 7B is a cross-sectional view showing the lead hole forming machine of FIG. 7A taken along the line VIIB-VIIB.

First, in Step S1 of the second embodiment, the lead hole 14 is formed with a lead hole forming machine 20 having a punch 41 as shown in FIGS. 7A and 7B, instead of the punch 21 of the first embodiment. The punch 41 is formed in the shape of a cylinder, whose diameter is substantially constant along the extending direction of its central axis $P_f$. An intersection line between the virtual plane $R_f$, which is perpendicular to the central axis $P_f$, and the outer peripheral surface 42$a$, 43$a$ of the punch 41 is formed in an oval shape as shown in FIG. 7B. The direction of the major axis of the oval shape coincides with the direction of the intersection line $U_f$ between the virtual plane L, which includes the thickness direction axis T of the base material 11 sandwiched by the die 24 and the guide 26 and the central axis $P_f$ of the punch 41, and the virtual plane $R_f$. The punch 41 is formed with a processing portion 42 and a held portion 43, which correspond to the processing portion 22 and the held portion 23 of the first embodiment, respectively.

Figure 8A:
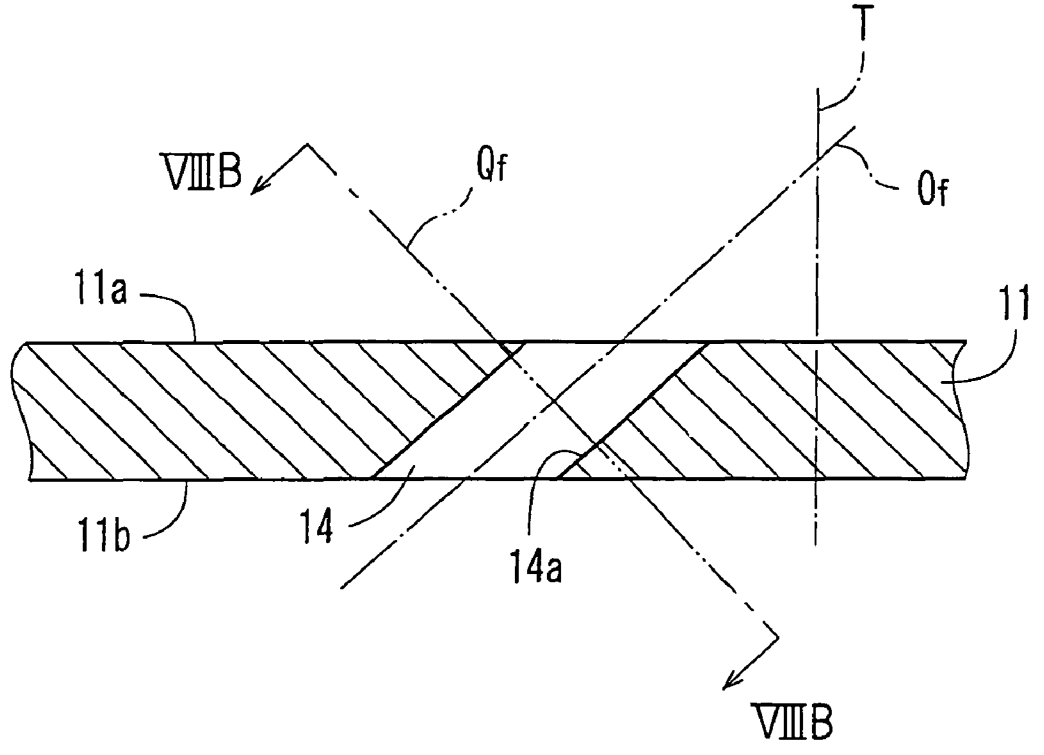
FIG. 8A is a cross-sectional view showing a base material formed with a lead hole according to the second embodiment.
Figure 8B:
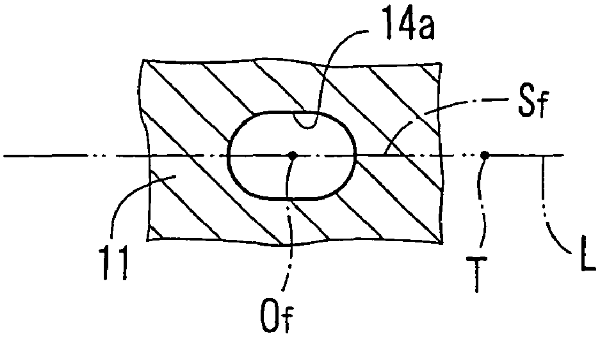
FIG. 8B is a cross-sectional view showing the base material of FIG. 8A taken along the line IXB-IXB.

The punch 41 is moved to punch the lead hole 14 in the base material 11 with the processing portion 42, like the punch 21 of the first embodiment. Thus, the lead hole 14 is formed in the shape complementing the shape of the outer peripheral surface 42$a$ of the processing portion 42. More specifically, as shown in FIG. 8A, the lead hole 14 is formed in the shape of a cylindrical hole whose internal diameter is substantially constant along the extending direction of its central axis $O_f$. The closed curves among the intersection lines between the inner peripheral surface 14$a$ of the lead hole 14 and the virtual plane $Q_f$ perpendicular to the central axis $O_f$ are oval in shape. The direction of the major axis of each oval shape is directed along the extending direction of the intersection line $S_f$ between the virtual plane L, which includes the central axis $O_f$ the lead hole 14 and the thickness direction axis T of the base material 11, and the virtual plane $Q_f$.

Figure 9A:
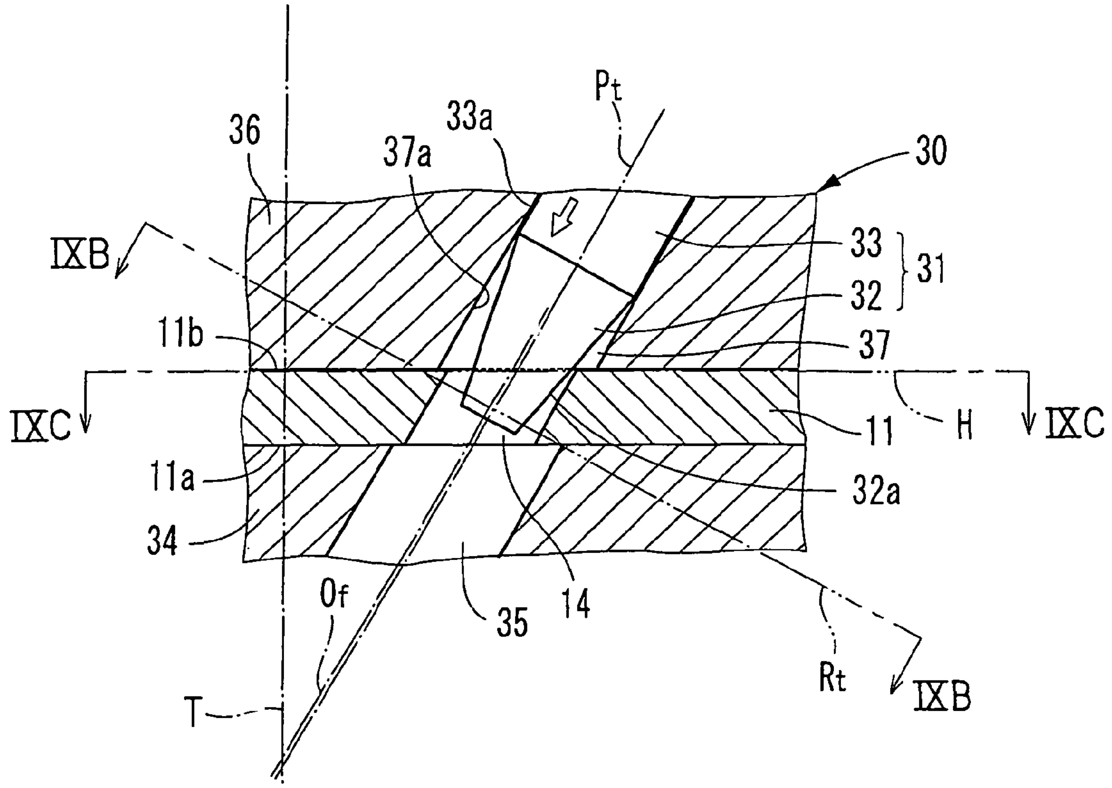
FIG. 9A is a cross-sectional view showing a taper hole forming machine according to the second embodiment.
Figure 9B:
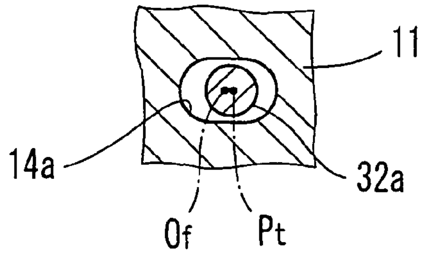
FIG. 9B is a cross-sectional view showing the taper hole forming machine of FIG. 9A taken along the line IXB-IXB.
Figure 9C:
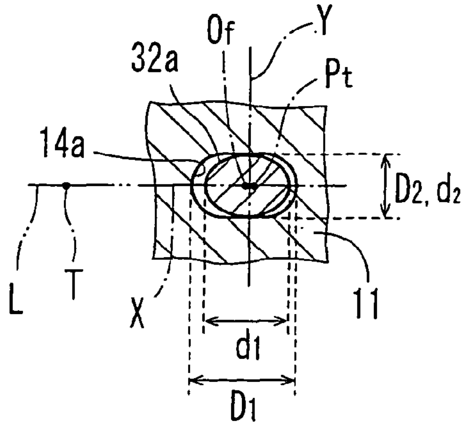
FIG. 9C is a cross-sectional view showing the taper hole forming machine of FIG. 9A taken along the line IXC-IXC.

In the second embodiment, the shape of the intersection line between the coordinate plane H and the inner peripheral surface 14$a$ of the lead hole 14 is the oval shape, whose major axis is directed in the extending direction of the first coordinate axis X in the state where the base material 11 is disposed between the die 34 and the guide 36 as shown in FIG. 9A. The direction of the major axis of the intersection line between the coordinate plane H and the outer peripheral surface 32$a$ of the processing portion 32 coincides with the extending direction of the first coordinate axis X. The ratio of the diameter d1 to the diameter d2 (the ratio d1/d2) of the intersection line between the coordinate plane H and the outer peripheral surface 32$a$ of the processing portion 32 is less than the ratio of the diameter D1 to the diameter D2 (the ratio D1/D2) of the intersection line between the coordinate plane H and the inner peripheral surface 14$a$ of the lead hole 14. Therefore, in the early stage of the punch press in Step S2, the processing portion 32 can contact the edge of the opening of the lead hole 14 at two points on both sides of the virtual plane L, which includes the central axis $O_f$ the lead hole 14, the central axis $P_t$ of the processing portion 32 and the thickness direction axis T of the base material 11. As a result, the bending moment applied to the processing portion 32 can be reduced, so as to prevent the breakage of the punch 31.

Third Embodiment

Next, a method for forming the injection hole by using a lead hole forming machine and a taper hole forming machine according to the third embodiment will be explained based on FIGS. 10A to 12C.

Figure 10A:
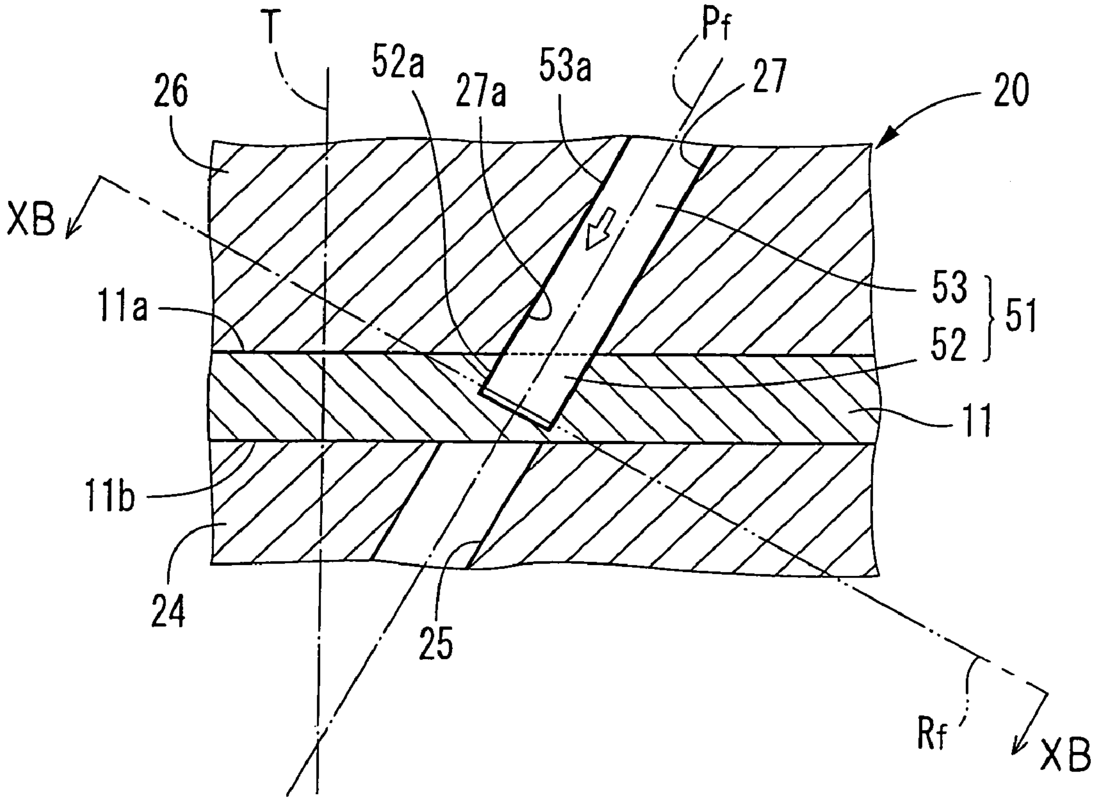
FIG. 10A is a cross-sectional view showing a lead hole forming machine according to a third embodiment of the present invention.
Figure 10B:
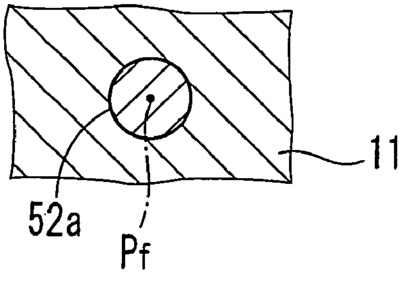
FIG. 10B is a cross-sectional view showing the lead hole forming machine of FIG. 10A taken along the line XB-XB.

In Step S1 of the third embodiment, the lead hole 14 is formed with a lead hole forming machine 20 having a punch 51 as shown in FIGS. 10A and 10B, instead of the punch 21 of the first embodiment. The punch 51 is formed in the shape of a cylinder, whose diameter is substantially constant along the extending direction of its central axis $P_f$. The intersection line between the virtual plane $R_f$, which is perpendicular to the central axis $P_f$, and an outer peripheral surface 52$a$, 53$a$ of the punch 51 is round in shape as shown in FIG. 10B. The punch 51 is formed with a processing portion 52 and a held portion 53, which respectively correspond to the processing portion 22 and the held portion 23 of the first embodiment.

Figure 11A:
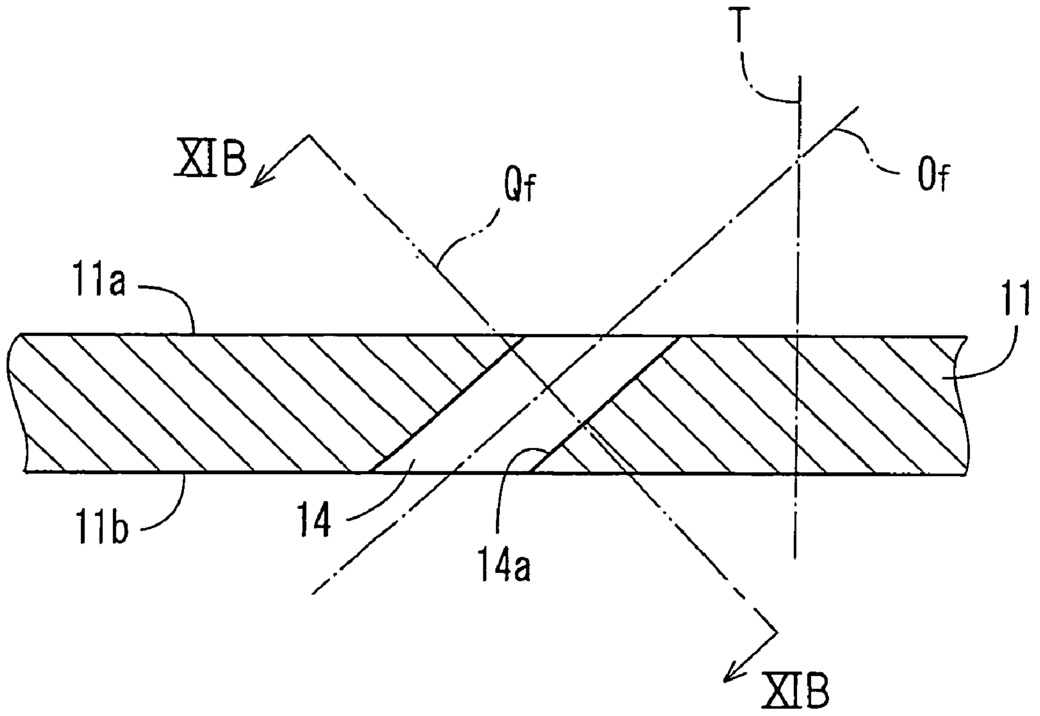
FIG. 11A is a cross-sectional view showing a base material formed with a lead hole according to the third embodiment.
Figure 11B:
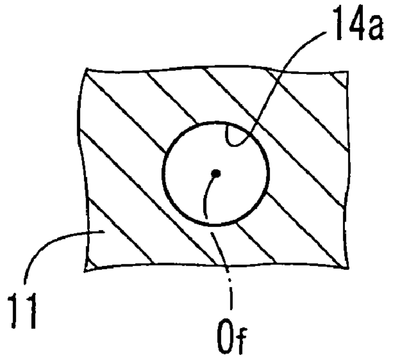
FIG. 11B is a cross-sectional view showing the base material of FIG. 11A taken along the line XIB-XIB.

The punch 51 is moved to punch the lead hole 14 in the base material 11 with the processing portion 52, like the punch 21 of the first embodiment. Thus, the lead hole 14 is formed in the shape complementing the shape of the outer peripheral surface 52$a$ of the processing portion 52. More specifically, as shown in FIG. 11A, the lead hole 14 is formed in the shape of a cylinder whose diameter is substantially constant along the extending direction of its central axis $O_f$. The closed curves among the intersection lines between the inner peripheral surface 14$a$ of the lead hole 14 and the virtual plane $Q_f$, which is perpendicular to the central axis $O_f$, are round in shape as shown in FIG. 11B.

Figure 12A:
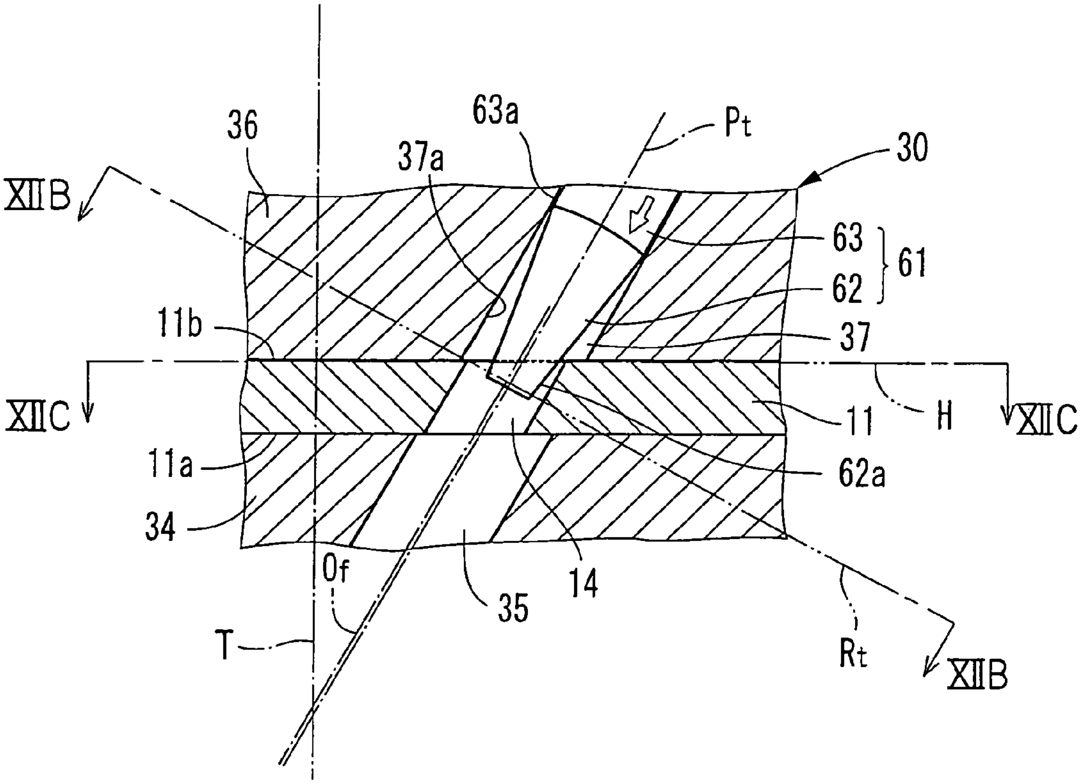
FIG. 12A is a cross-sectional view showing a taper hole forming machine according to the third embodiment.
Figure 12B:
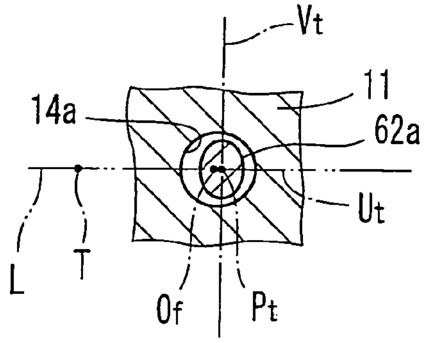
FIG. 12B is a cross-sectional view showing the taper hole forming machine of FIG. 12A taken along the line XIIB-XIIB.

In Step S2 of the third embodiment, the taper hole 12 is formed with a taper hole forming machine 30 having a punch 61 as shown in FIG. 12A, instead of the punch 31 of the first embodiment. The punch 61 is formed with a processing portion 62 and a held portion 63, which correspond to the processing portion 32 and the held portion 33 of the first embodiment, respectively. The processing portion 62 is formed in the shape of a truncated cone whose diameter decreases toward its tip end along the extending direction of its central axis $P_t$ as shown in FIG. 12A. The shape of the intersection line between the virtual plane $R_t$, which is perpendicular to the central axis $P_t$, and the outer peripheral surface 62$a$ of the processing portion 62 is the elliptic shape. In FIG. 12B, a line $U_t$ is an intersection line between the virtual plane L, which includes the thickness direction axis T of the base material 11 held between the die 34 and the guide 36 and the central axis $P_t$ of the punch 61, and the virtual plane $R_t$. The direction of the major axis of the elliptic shape of the intersection line between the virtual plane $R_t$ and the outer peripheral surface 62$a$ of the processing portion 62 coincides with the direction of a perpendicular line $V_t$ perpendicular to the intersection line $U_t$. The diameter of the tip end of the processing portion 62 on the smaller diameter side is formed to be smaller than the opening of the lead hole 14.

Figure 13A:
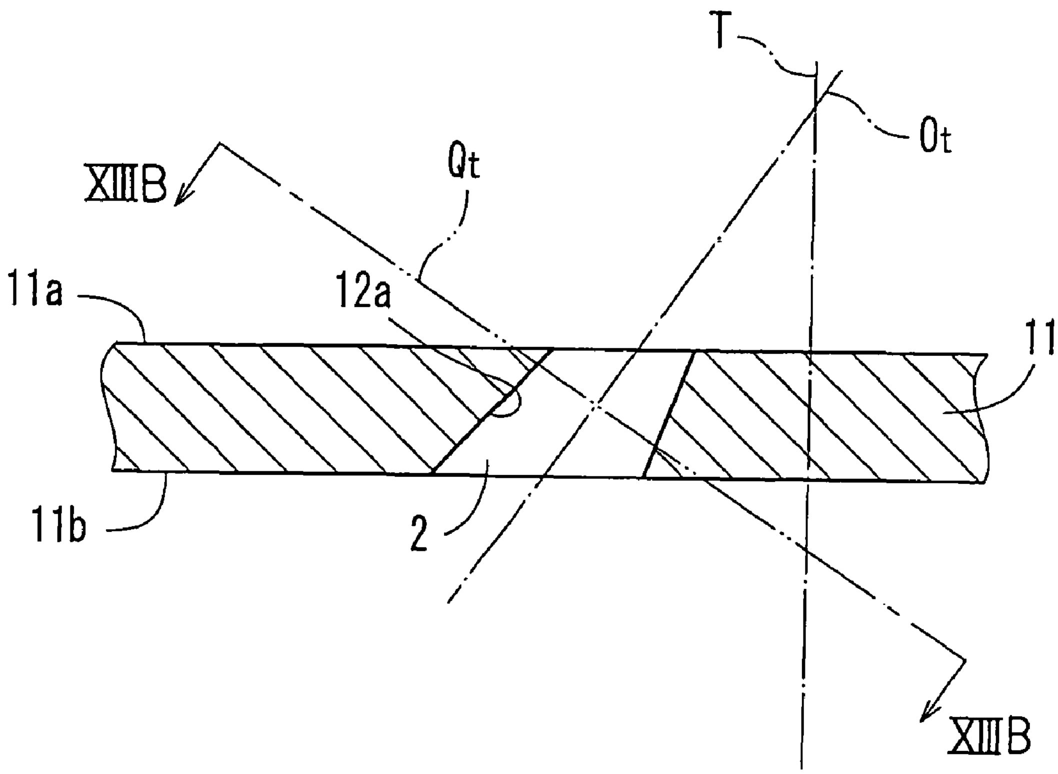
FIG. 13A is a cross-sectional view showing an injection hole member according to the third embodiment.
Figure 13B:
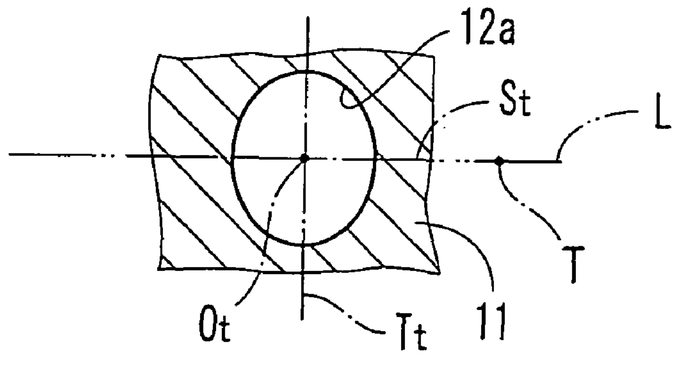
FIG. 13B is a cross-sectional view showing the injection hole member of FIG. 13A taken along the line XIIIB-XIIIB.

Like the first embodiment, the punch 61 is moved to punch the taper hole 12 in the base material 11 with the processing portion 62. Thus, the taper hole 12 is formed in the shape complementing the shape of the outer peripheral surface 62$a$ of the processing portion 62. More specifically, the taper hole 12 is formed in the shape of a cone whose diameter increases in the direction from the upstream end surface 11$a$ toward the downstream end surface 11$b$ of the base material 11 as shown in FIG. 13A. The closed curves among the intersection lines between the inner peripheral surface 12$a$ of the taper hole 12 and the virtual plane $Q_t$ perpendicular to the central axis $O_t$ are elliptic in shape as shown in FIG. 13B. In FIG. 13B, a line $S_t$ represents an intersection line between the virtual plane L, which includes the central axis $O_t$ of the taper hole 12 and the thickness direction axis T of the base material 11, and the virtual plane $Q_t$. The direction of the major axis of the elliptic shape of the intersection line between the inner peripheral surface 12$a$ of the taper hole 12 and the virtual plane $Q_t$ coincides with an extending direction of a line $T_t$, which is perpendicular to the intersection line $S_t$ on the virtual plane $Q_t$.

Figure 12C:
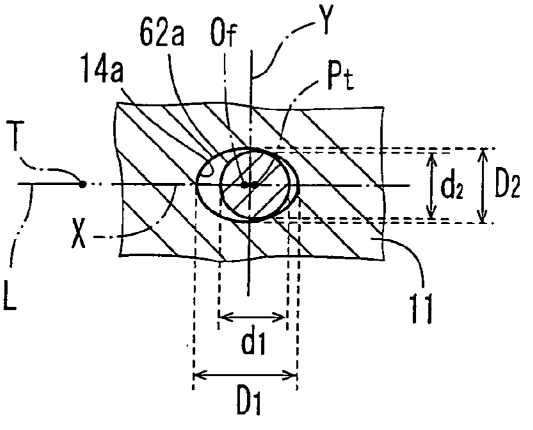
FIG. 12C is a cross-sectional view showing the taper hole forming machine of FIG. 12A taken along the line XIIC-XIIC.

In the third embodiment, the shape of the intersection line between the coordinate plane H and the inner peripheral surface 14*a* of the lead hole 14 in the state where the base material 11 is held between the die 34 and the guide 36 as shown in FIG. 12A is the elliptic shape whose major axis is directed in the extending direction of the first coordinate axis X as shown in FIG. 12C. In FIG. 12C, the diameter d1 represents the diameter of the intersection line between the coordinate plane H and the outer peripheral surface 62*a* of the processing portion 62 along the first coordinate axis X. The diameter d2 represents the diameter of the intersection line between the coordinate plane H and the outer peripheral surface 62*a* of the processing portion 62 along the second coordinate axis Y. The diameter D1 represents the diameter of the intersection line between the coordinate plane H and the inner peripheral surface 14*a* of the lead hole 14 along the first coordinate axis X. The diameter D2 represents the diameter of the intersection line between the coordinate plane H and the inner peripheral surface 14*a* of the lead hole 14 along the second coordinate axis Y. The ratio of the diameter d1 to the diameter d2 (the ratio d1/d2) of the intersection line between the coordinate plane H and the outer peripheral surface 62*a* of the processing portion 62 is less than the ratio of the diameter D1 to the diameter D2 (the ratio D1/D2) of the intersection line between the coordinate plane H and the inner peripheral surface 14*a* of the lead hole 14. Therefore, in the early stage of the punch press in Step S2, the processing portion 32 can contact the edge of the opening of the lead hole 14 at two points on the both sides of the virtual plane L, which includes the central axis $O_f$ Of the lead hole 14, the central axis $P_t$ of the processing portion 62 and the thickness direction axis T of the base material 11. As a result, the bending moment applied to the processing portion 62 can be reduced, so as to prevent the breakage of the punch 61.

Figure 14A:
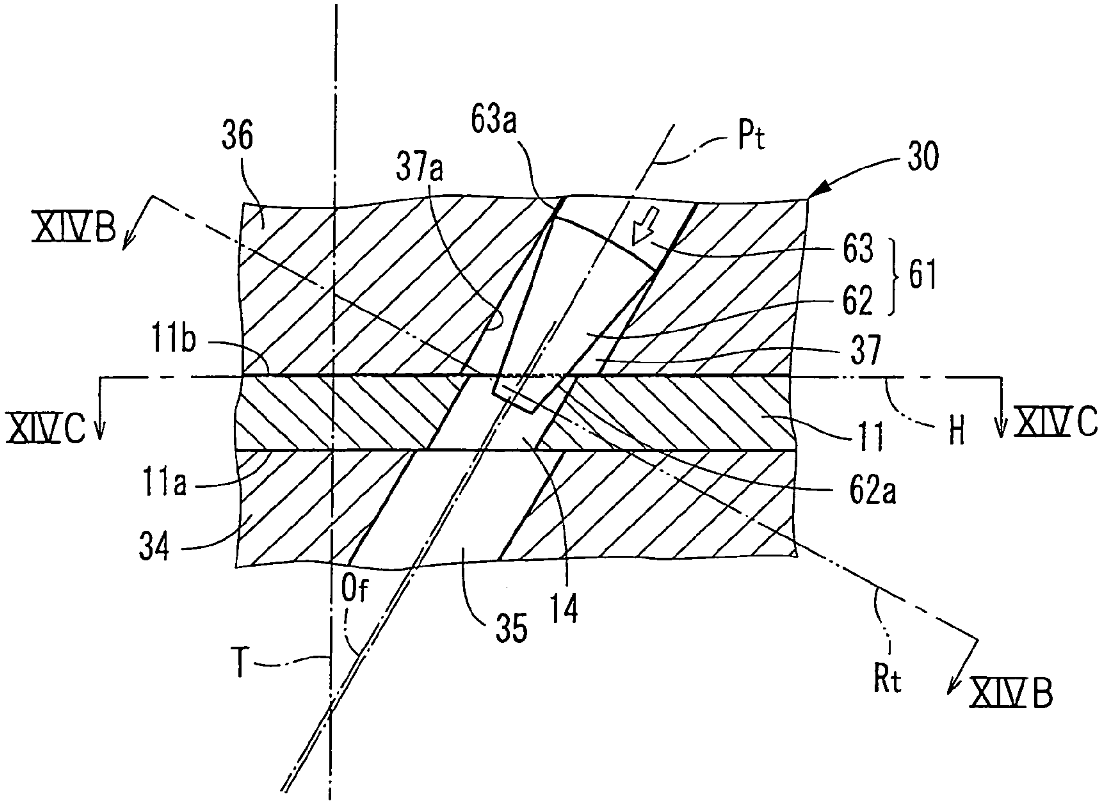
FIG. 14A is a cross-sectional view showing a taper hole forming machine according to a modified example of the third embodiment.
Figure 14B:
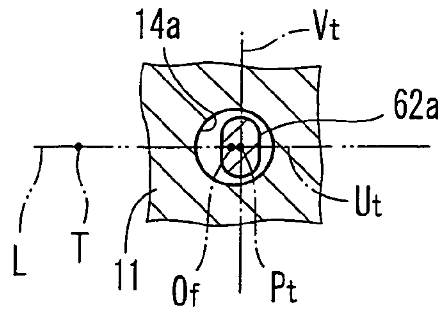
FIG. 14B is a cross-sectional view showing the taper hole forming machine of FIG. 14A taken along the line XIVB-XIVB.
Figure 14C:
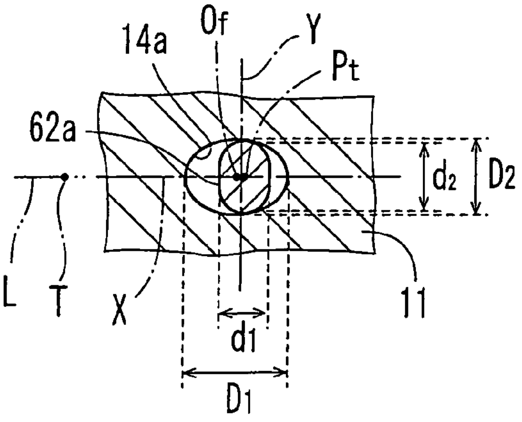
FIG. 14C is a cross-sectional view showing the taper hole forming machine of FIG. 14A taken along the line XIVC-XIVC.

As shown in FIGS. 14B and 14C, the shape of the intersection line between the outer peripheral surface 62*a* of the processing portion 62 and the virtual plane $R_t$ may be the oval shape so that the major axis of the oval shape is directed in the extending direction of a perpendicular line $V_t$, which is perpendicular to the intersection line $U_t$ between the virtual plane L and the virtual plane $R_t$.

Figure 15A:
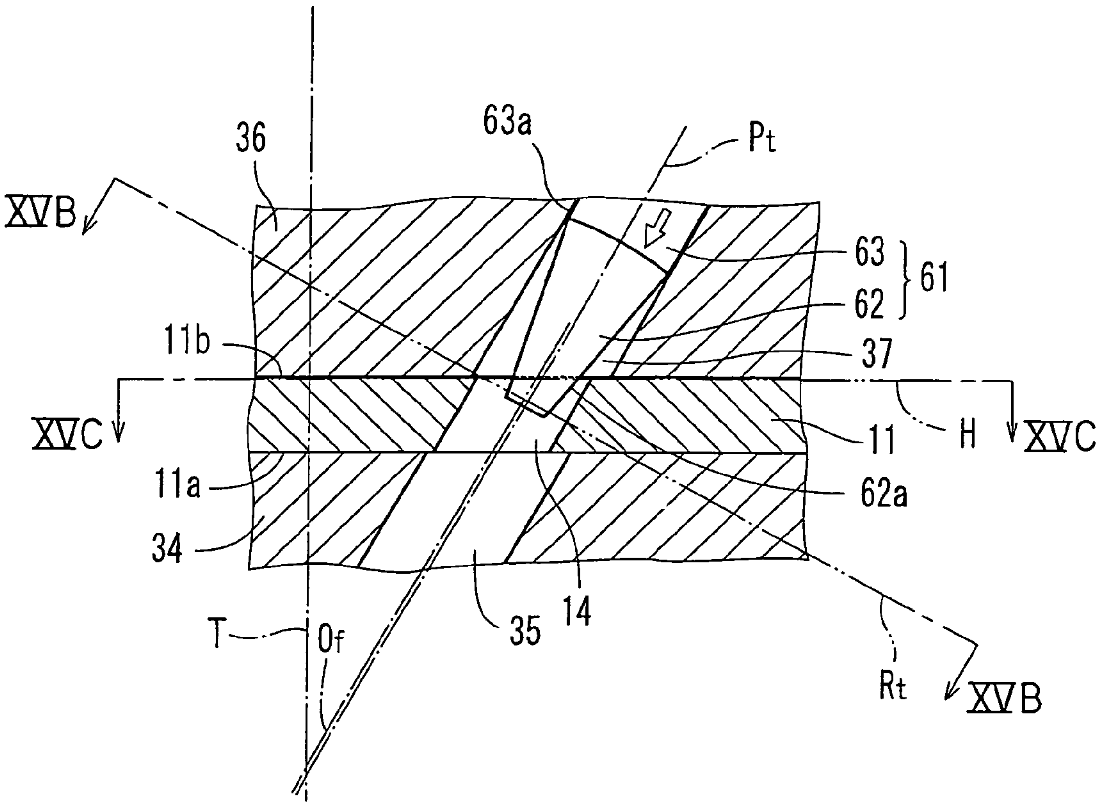
FIG. 15A is a cross-sectional view showing a taper hole forming machine according to another modified example of the third embodiment.
Figure 15B:
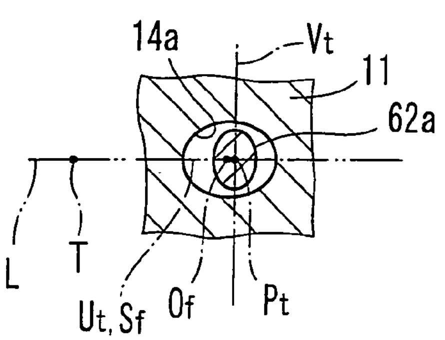
FIG. 15B is a cross-sectional view showing the taper hole forming machine of FIG. 15A taken along the line XVB-XVB.
Figure 15C:
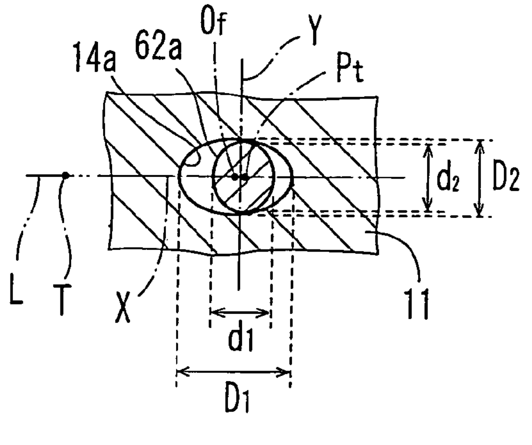
FIG. 15C is a cross-sectional view showing the taper hole forming machine of FIG. 15A taken along the line XVC-XVC.

Alternatively, as shown in FIGS. 15A to 15C, the taper hole 12 may be formed with the use of the taper hole forming machine 30, which has the punch 61 of the third embodiment shown in FIGS. 12A to 12C or of the modified example of the third embodiment shown in FIGS. 14A to 14C, in the base material 11, in which the lead hole 14 is formed with the lead hole forming machine 20 having the punch 21 of the first embodiment or the punch 41 of the second embodiment.

Fourth Embodiment

Figure 16A:
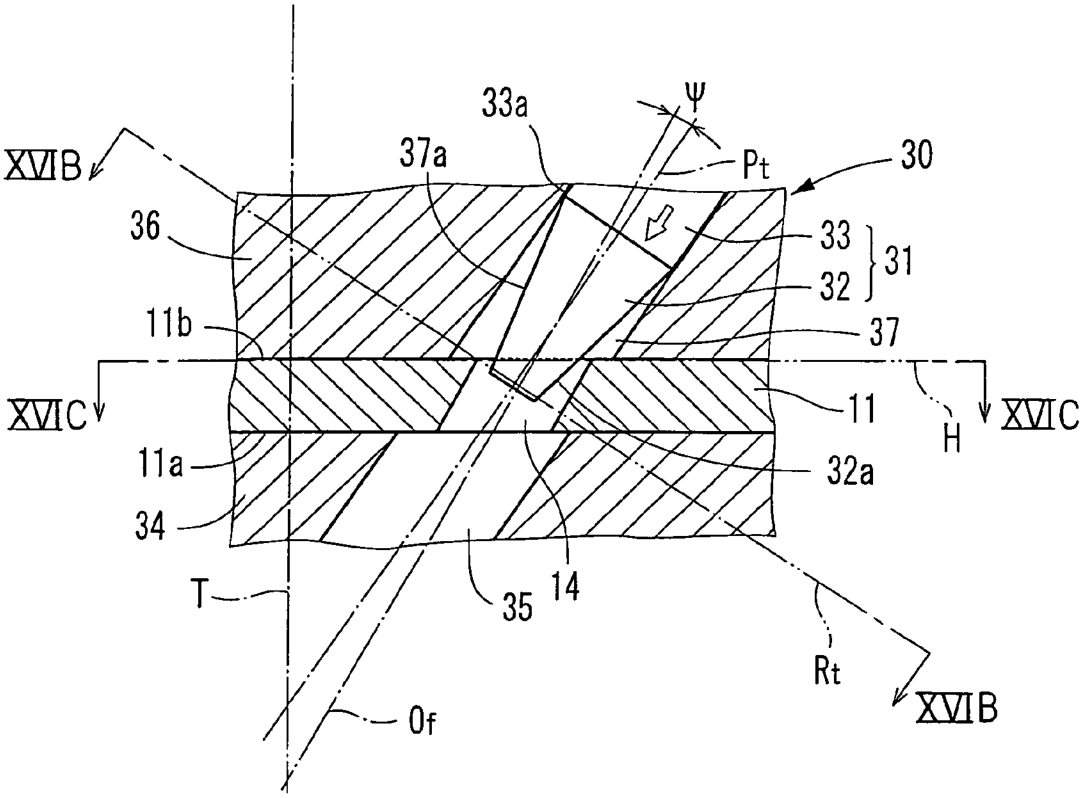
FIG. 16A is a cross-sectional view showing a taper hole forming machine according to a fourth embodiment of the present invention.
Figure 16B:
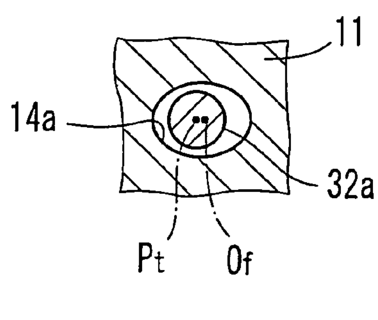
FIG. 16B is a cross-sectional view showing the taper hole forming machine of FIG. 16A taken along the line XVIB-XVIB.
Figure 16C:
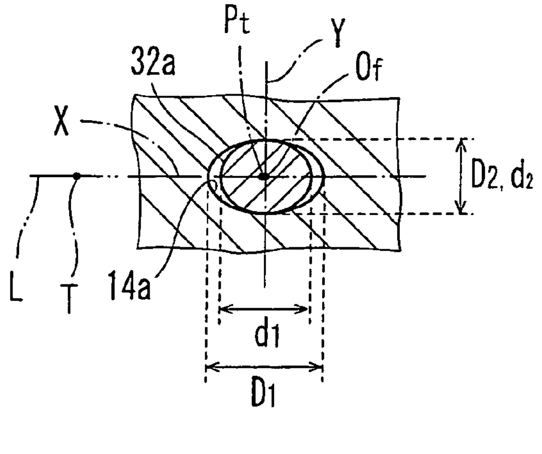
FIG. 16C is a cross-sectional view showing the taper hole forming machine of FIG. 16A taken along the line XVIC-XVIC.

Next, a method for forming the injection hole 12 by using a taper hole forming machine according to the fourth embodiment will be explained based on FIGS. 16A to 16C.

In the taper hole forming machine 30 used in the process of Step S2 of the fourth embodiment, the central axis $P_t$ of the punch 31 (the processing portion 32) is inclined to the same side as the central axis $O_f$ the lead hole 14 formed in the base material 11 with respect to the thickness direction axis T of the base material 11, which is held between the die 34 and the guide 36. However, the angle of the inclination of the central axis $P_t$ of the punch 31 is different from that of the central axis $O_f$ the lead hole 14 as shown in FIG. 16A. More specifically, in the fourth embodiment, the central axis $P_t$ of the punch 31 is inclined also with respect to the central axis $O_f$ the lead hole 14. In the fourth embodiment, the central axis $P_t$ of the punch 31 is inclined with respect to the central axis $O_f$ the lead hole 14 by an angle Ψ so that the central axis $P_t$ of the punch 31 is laid down toward the downstream end surface 11*b* of the base material 11. More specifically, the central axis $P_t$ of the processing portion 32 is inclined with respect to the central axis $O_f$ the lead hole 14 by an angle Ψ so that the acute angle provided between the central axis $P_t$ of the punch 31 and the thickness direction axis T of the base material 11 becomes larger than the acute angle provided between the central axis $O_f$ the lead hole 14 and the thickness direction axis T.

In the state where the base material 11 is held between the die 34 and the guide 36 of the fourth embodiment, the shape of the intersection line between the coordinate plane H and the inner peripheral surface 14*a* of the lead hole 14 is an elliptic shape, whose major axis is directed in the extending direction of the first coordinate axis X. Meanwhile, the shape of the intersection line between the coordinate plane H and the outer peripheral surface 32*a* of the processing portion 32 is an elliptic shape, whose major axis is directed in the extending direction of the first coordinate axis X. In FIG. 16C, the diameter d1 represents the diameter of the intersection line between the coordinate plane H and the outer peripheral surface 32*a* of the processing portion 32 along the first coordinate axis X. The diameter d2 represents the diameter of the intersection line between the coordinate plane H and the outer peripheral surface 32*a* of the processing portion 32 along the second coordinate axis Y. The diameter D1 represents the diameter of the intersection line between the coordinate plane H and the inner peripheral surface 14*a* of the lead hole 14 along the first coordinate axis X. The diameter D2 represents the diameter of the intersection line between the coordinate plane H and the inner peripheral surface 14*a* of the lead hole 14 along the second coordinate axis Y. The angle Ψ of the inclination of the central axis $P_t$ of the processing portion 32 with respect to the central axis $O_f$ the lead hole 14 is set so that the ratio of the diameter d1 to the diameter d2 of the intersection line between the coordinate plane H and the outer peripheral surface 32*a* of the processing portion 32 is less than the ratio of the diameter D1 to the diameter D2 of the intersection line between the coordinate plane H and the inner peripheral surface 14*a* of the lead hole 14 as shown in FIG. 16C. Therefore, in the early stage of the punch press in Step S2, the processing portion 32 can contact the edge of the opening of the lead hole 14 at two points on both sides of the virtual plane L, which includes the central axis $O_f$ Of the lead hole 14, the central axis $P_t$ of the processing portion 32 and the thickness direction axis T of the base material 11. As a result, the bending moment applied to the processing portion 32 can be reduced, so as to prevent the breakage of the punch 31.

Alternatively, the inclination angle of the central axis $P_t$ of the processing portion 32 with respect to the central axis $O_f$ the lead hole 14 may be set so that the central axis $P_t$ is raised from the downstream end surface 11*b* of the base material 11. More specifically, the inclination angle of the central axis $P_t$ of the processing portion 32 with respect to the central axis $O_f$ the lead hole 14 may be set so that the acute angle provided between the central axis $P_t$ of the processing portion 32 and the thickness direction axis T becomes smaller than the acute angle provided between the central axis $O_f$ the lead hole 14 and the thickness direction axis T. In this case also, the inclination angle Ψ of the central axis $P_t$ of the processing portion 32 with respect to the central axis $O_f$ the lead hole 14 is set so that the ratio of the diameter d1 to the diameter d2 is less than the ratio of the diameter D1 to the diameter D2.

In the above second embodiment, the third embodiment and the modified examples of the third embodiment, the central axis $P_t$ of the processing portion 32, 62 may be inclined with respect to the central axis $O_f$ the lead hole 14.

In the above embodiments, the present invention is applied to the manufacture of the injection hole member used in the fuel injection device for injecting the fuel. Alternatively, the present invention can be applied to the manufacture of an injection hole member used in an injection device for injecting fluid other than the fuel.

In the above embodiments, the injection hole is provided only by the taper hole 12. Alternatively, the taper hole 12 may be partly deformed after the taper hole 12 is formed, and the deformed portion and the other portion of the taper hole 12 may provide the injection hole.

In the above embodiments, the pressing direction for forming the taper hole is set to be opposite to the pressing direction for forming the lead hole. Alternatively, the pressing direction for forming the taper hole may be set to the same direction as the pressing direction for forming the lead hole.

Fifth Embodiment

Figure 18:
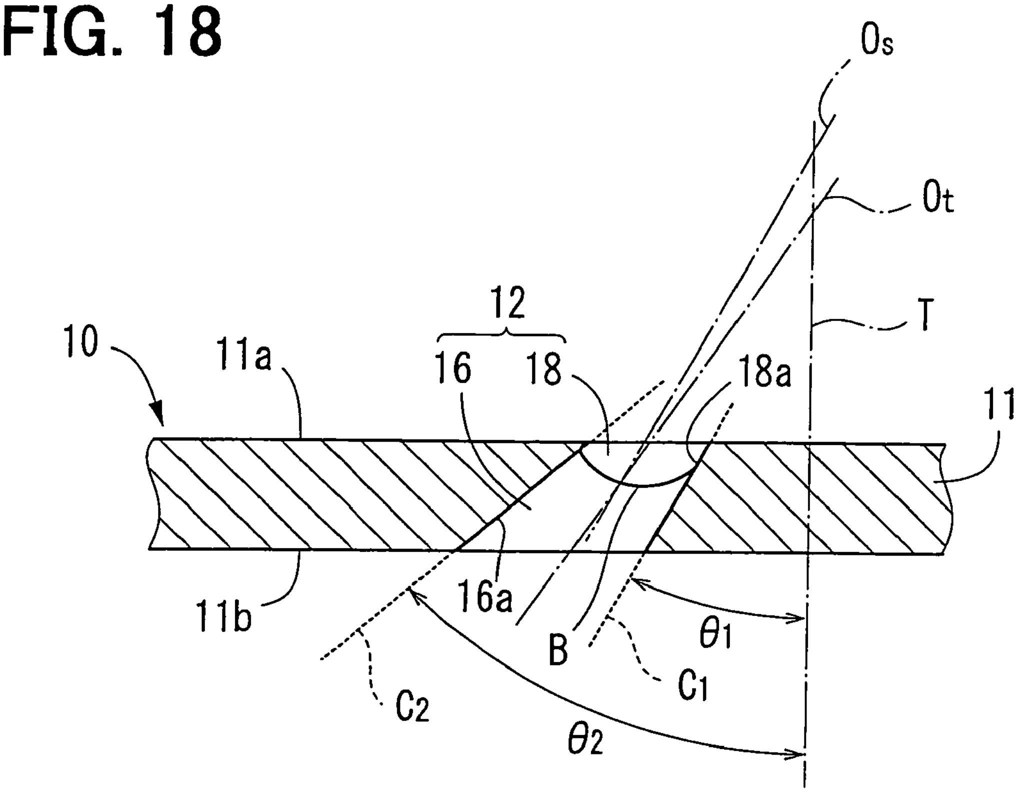
FIG. 18 is a cross-sectional view showing an injection hole member according to the fifth embodiment.

Next, a method for manufacturing the injection hole member 10 according to the fifth embodiment will be explained based on FIG. 18.

The injection hole member 10 is manufactured by forming injection holes 12 in a base material 11, which is a metallic member formed of stainless steel and the like. An upstream opening of the injection hole 12 is provided by a straight hole 18, and a major part of the injection hole 12 other than its upstream end opening is provided by a taper hole 16. More specifically, the injection hole 12 is provided by the straight hole 18, which opens into an upstream end surface 11*a* of the base material 11, and the taper hole 16, which opens into a downstream end surface 11*b* of the base material 11.

The straight hole 18 is a circular cylindrical hole, whose diameter is substantially constant along an extending direction of its central axis $O_s$. Closed curves among intersection lines between a virtual plane, which is perpendicular to the central axis $O_s$, and an inner peripheral surface 18*a* of the straight hole 18 are round in shape. The central axis $O_s$ of the straight hole 18 is inclined with respect to an axis T of the base material 11 in its thickness direction.

The taper hole 16 is formed in a conical shape, whose inner diameter increases along the extending direction of its central axis $O_t$ from the upstream side toward the downstream side. Closed curves among the intersection lines between the virtual plane, which is perpendicular to the central axis $O_t$, and the inner peripheral surface 16*a* of the taper hole 16 are round in shape. The central axis $O_t$ of the taper hole 16 is inclined to the same side as the central axis $O_s$ of the straight hole 18 with respect to the thickness direction axis T of the base material 11. An inclination angle of the central axis $O_t$ of the taper hole 16 is different from that of the central axis $O_s$ of the straight hole 18. Thus, the taper hole 16, whose inner diameter increases from the upstream side toward the downstream side, is employed, so the diameters of droplets of fuel spray are minimized. In the present embodiment, two intersection lines C1, C2 between a cross section defined by a virtual plane, which includes the central axis $O_t$ of the taper hole 16 and is perpendicular to the end surfaces 11*a*, 11*b* of the base material 11, and the inner peripheral surface 16*a* of the taper hole 16 are inclined to the same side with respect to the thickness direction axis T of the base material 11. More specifically, two intersection lines C1, C2 provided by a cross section of the base material 11 in its thickness direction shown by a shaded area in FIG. 18 and the inner peripheral surface 16*a* of the taper hole 16 are inclined to the same side with respect to the thickness direction axis T of the base material 11. As shown in FIG. 18, an inclination angle θ1 provided between the intersection line C1 and the thickness direction axis T of the base material 11 is more acute than another inclination angle θ2 provided between the intersection line C2 and the thickness direction axis T of the base material 11. The inner peripheral surface 16*a* of the taper hole 16 connects to an inner peripheral surface 18*a* of the straight hole 18 at a boundary line B, which continues circumferentially. The boundary line B is formed in a bow shape protruding toward the taper hole 16 between the intersection lines C1, C2 on both sides of the virtual plane, which provides the intersection lines C1, C2 with the inner peripheral surface 16*a* of the taper hole 16.

Next, a method for manufacturing the injection hole member 10 of the present embodiment will be explained based on FIGS. 17A, 17B, 17C and 19.

Figure 17A:
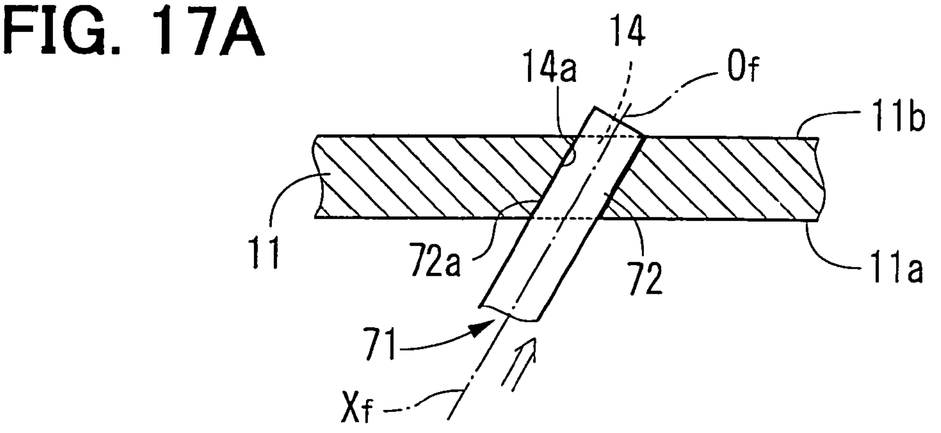
FIG. 17A is a schematic diagram showing a method for forming a lead hole with a lead hole forming machine according to a fifth embodiment of the present invention.
Figure 19:
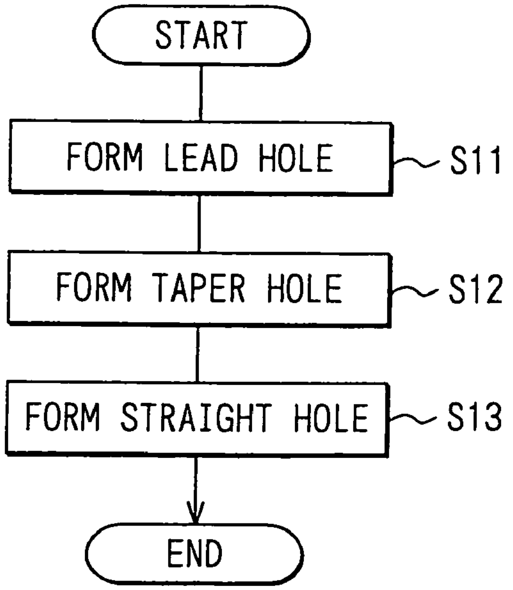
FIG. 19 is a flowchart showing a method for forming the injection hole member according to the fifth embodiment.

First, in Step S11 of a flowchart shown in FIG. 19, a lead hole 14 is formed in the base material 11, which is a flat plate in shape, through the punch press as shown in FIG. 17A.

Figure 20:
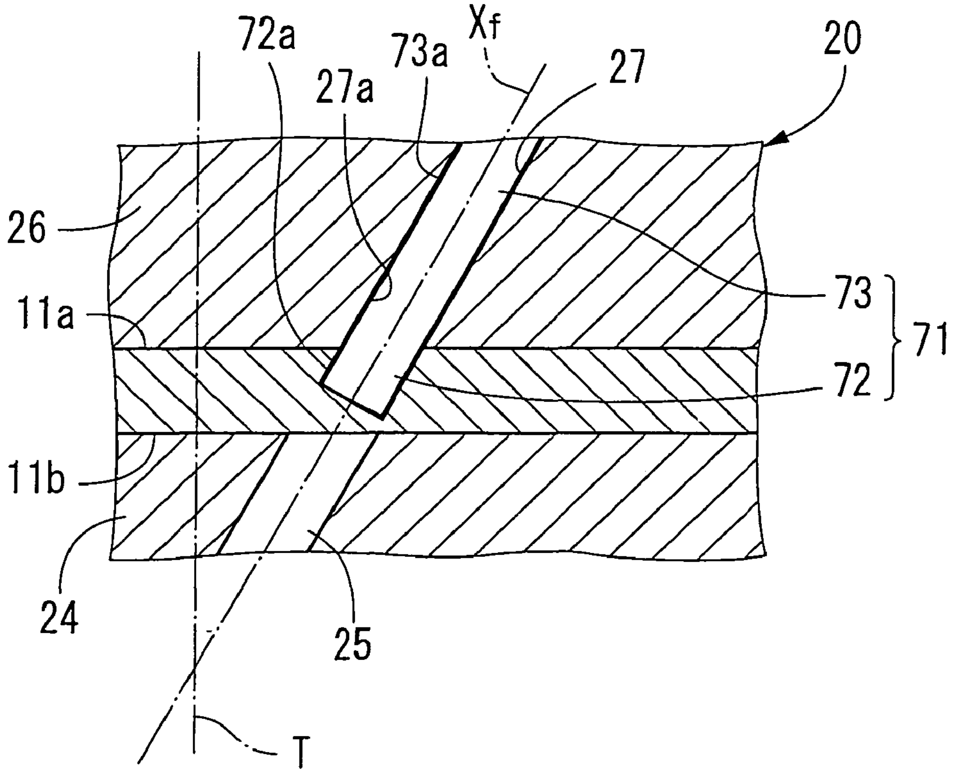
FIG. 20 is a cross-sectional view showing the lead hole forming machine according to the fifth embodiment.

Specifically, a lead hole forming machine 20 having a punch 71, a die 24 and a guide 26 as shown in FIG. 20 is used to form the lead hole 14.

In the lead hole forming machine 20, the die 24 and the guide 26 contact the downstream end surface 11*b* and the upstream end surface 11*a* of the base material 11 respectively, so that the die 24 and the guide 26 hold the base material 11 therebetween. The punch 71 is formed in the shape of a circular cylinder, whose diameter is substantially constant toward its tip end. An outline of a cross section of the punch 71 defined by a virtual plane perpendicular to its central axis $X_f$ is round in shape. A processing portion 72 is formed on the tip end of the punch 71 and a held portion 73 is formed on the punch 71 on the opposite side from the processing portion 72. The punch 71 is inserted into a guide hole 27 of the guide 26 and is held by at least the inner peripheral surface 27*a* of the guide hole 27, which slidably contacts an outer peripheral surface 73*a* of the held portion 73 throughout the periphery. Accordingly, the central axis $X_f$ of the punch 71 is inclined with respect to the thickness direction axis T of the base material 11 held between the die 24 and the guide 26. Thus, the punch 71 is guided in the extending direction of the central axis $X_f$. The punch 71 guided by the guide 26 is slidably inserted into a pulling cavity 25 of the die 24.

Figure 21:
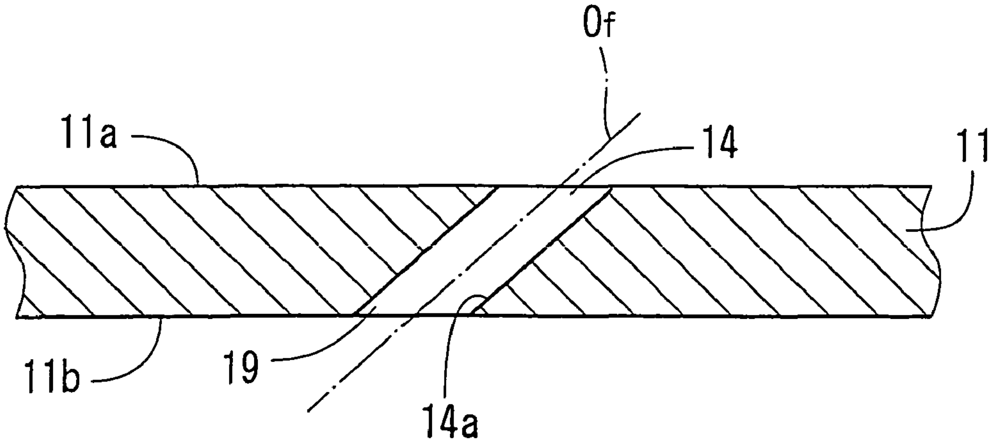
FIG. 21 is a cross-sectional view showing a base material formed with the lead hole according to the fifth embodiment.

When the lead hole 14 is formed by using the lead hole forming machine 20, the punch 71 is moved in the pressing direction from the upstream end surface 11*a* toward the downstream end surface 11*b* of the base material 11 along the central axis $X_f$ of the punch 71 as shown by an arrow mark in FIG. 17A or in FIG. 20. Thus, the lead hole 14 is punched in the base material 11 with the processing portion 72. The lead hole 14 is formed in the shape complementing the shape of the outer peripheral surface 72*a* of the processing portion 72. More specifically, the lead hole 14 is formed in the shape of a cylinder whose diameter is substantially constant in the extending direction of its central axis $O_f$ as shown in FIG. 21. Closed curves among intersection lines between a virtual plane, which is perpendicular to the central axis $O_f$ inclined with respect to the thickness direction axis T of the base material 11, and the inner peripheral surface 14*a* of the lead hole 14 are round in shape.

Figure 17B:
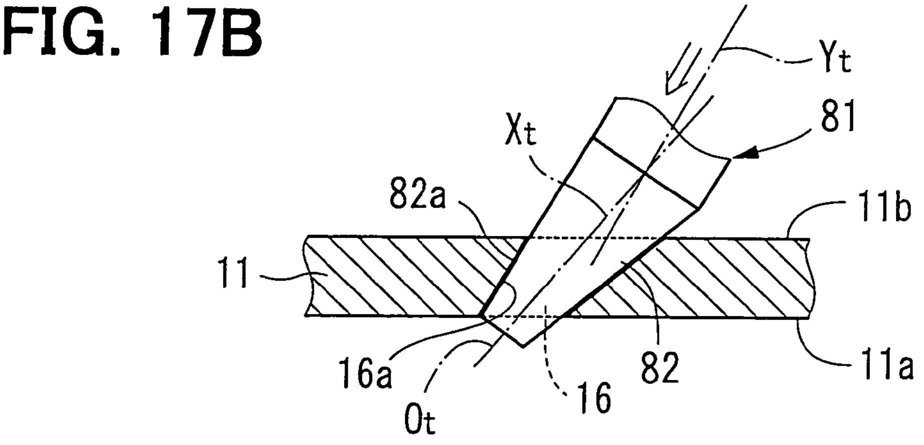
FIG. 17B is a schematic diagram showing a method for forming a taper hole with a taper hole forming machine according to the fifth embodiment.

Then, the taper hole 16 is formed in the base material 11 through the punch press as shown in FIG. 17B in Step S12 of the flowchart shown in FIG. 19.

Figure 22:
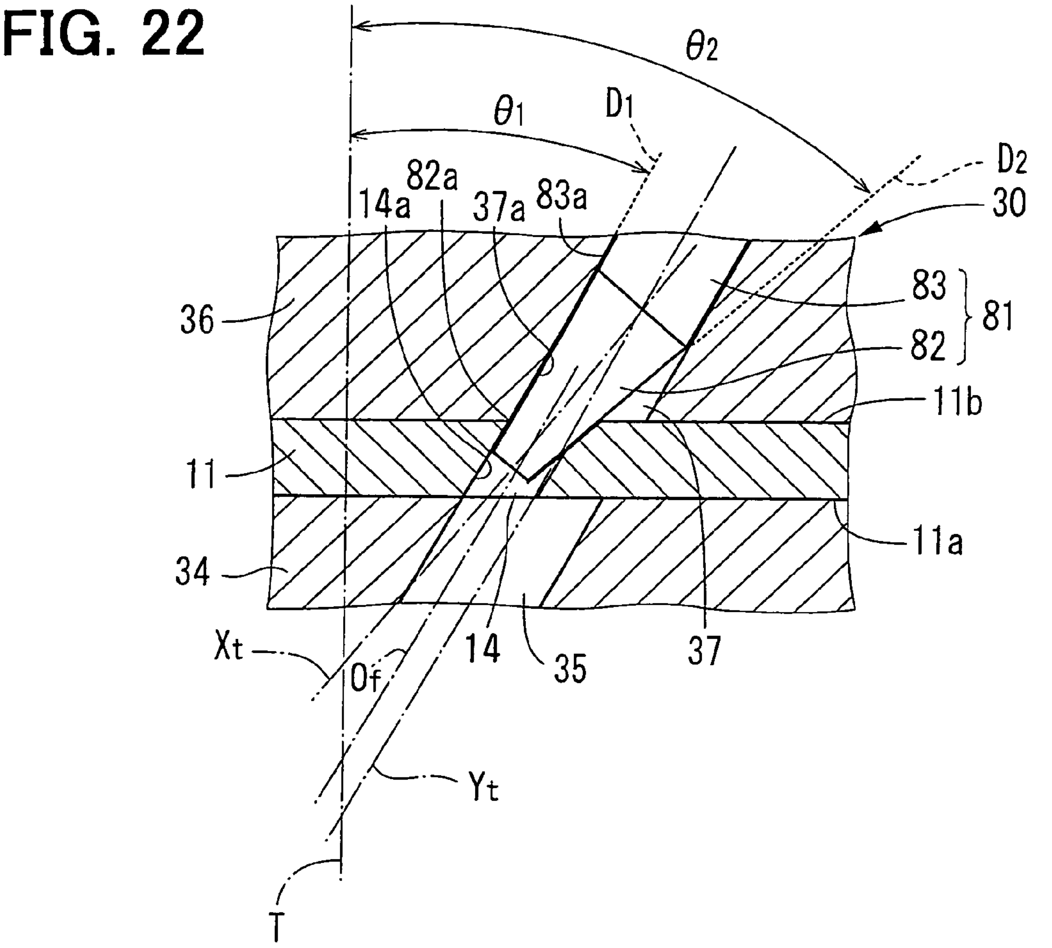
FIG. 22 is a cross-sectional view showing the taper hole forming machine according to the fifth embodiment.

Specifically, a taper hole forming machine 30 having a punch 81, a die 34 and a guide 36 as shown in FIG. 22 is used to form the taper hole 16.

In the taper hole forming machine 30, the die 34 and the guide 36 contact the upstream end surface 11*a* and the downstream end surface 11*b* of the base material 11 respectively, so the die 34 and the guide 36 hold the base material 11 therebetween. A processing portion 82 is formed on a tip end of the punch 81, and a held portion 83 is formed on the punch 81 on an opposite side from the processing portion 82. The processing portion 82 is formed in the shape of a truncated cone whose diameter decreases toward its tip end. An outline of the cross section of the processing portion 82 defined by a virtual plane perpendicular to its central axis $X_t$ is round in shape. On the cross section perpendicular to the central axis $X_t$ of the processing portion 82, the external diameter of the tip end of the processing portion 82 is formed to be smaller than the internal diameter of the opening of the lead hole 14. Meanwhile, on the cross section perpendicular to the central axis $X_t$ of the processing portion 82, the external diameter of the end of the processing portion 82 on the held portion 83 side is formed to be larger than the internal diameter of the opening of the lead hole 14. The held portion 83 is formed in the shape of a cylinder whose diameter is substantially constant along the extending direction of the central axis $Y_t$ of the held portion 83.

The processing portion 82 and the held portion 83 are inserted into the guide hole 37 of the guide 36. The held portion 83 is held by the inner peripheral surface 37*a* of the guide hole 37, which slidably contacts an outer peripheral surface 83*a* of the held portion 83 throughout the periphery. The central axis $Y_t$ of the held portion 83 is inclined with respect to the thickness direction axis T of the base material 11 held between the die 34 and the guide 36. Meanwhile, the central axis $Y_t$ of the held portion 83 is parallel to the central axis $O_f$ the lead hole 14 formed in the base material 11. The central axis $X_t$ of the processing portion 82 is inclined with respect to the thickness direction axis T of the base material 11 to the same side as the central axis $Y_t$ of the held portion 83. An inclination angle of central axis $X_t$ of the processing portion 82 is different from that of the central axis $Y_t$ of the held portion 83. Thus, the processing portion 82 slidably contacts the inner peripheral surface 37*a* of the guide hole 37 at the inner peripheral surface 82*a* on the opposite side from the base material 11 as shown in FIG. 22. The outer peripheral surface 82*a* of the processing portion 82 extends in parallel with the central axis $Y_t$ of the held portion 83 at the position where the processing portion 82 slidably contacts the inner peripheral surface 37*a*. Meanwhile, the outer peripheral surface 82*a* of the processing portion 82 smoothly connects to the outer peripheral surface 83*a* of the held portion 83 at the position where the processing portion 82 slidably contacts the inner peripheral surface 37*a*. Therefore, the punch 81 is guided by the guide 36 in the extending direction of the central axis $Y_t$ of the held portion 83. In the present embodiment, two intersection lines D1, D2 between a cross section provided between a virtual plane, which is perpendicular to the end surfaces 11*a*, 11*b* of the base material 11 and includes the central axis $X_t$ of the processing portion 82, and the outer peripheral surface 82*a* of the processing portion 82 are inclined to the same side with respect to the thickness direction axis T of the base material 11. More specifically, two intersection lines D1, D2 between a cross section of the base material 11 in its thickness direction shown by a shaded area in FIG. 22 and the inner peripheral surface 82*a* of the processing portion 82 are inclined to the same side with respect to the thickness direction axis T of the base material 11. The intersection line D1 running through the contacting position, where the outer peripheral surface 82*a* of the processing portion 82 slidably contacts the inner peripheral surface 37*a* of the guide hole 37, and the thickness direction axis T of the base material 11 provide an inclination angle θ1 therebetween. The intersection line D2 on the opposite side from the intersection line D1 across the central axis $X_t$ of the processing portion 82 and the thickness direction axis T provide an inclination angle θ2 therebetween. The punch 81 guided by the guide 36 is inserted into a pulling cavity 35 of the die 34 so that the punch 81 can move in a sliding manner.

In order to form the taper hole 16 by using the taper hole forming machine 30, the punch 81 is moved in a direction toward the tip end of the processing portion 82 along the central axis $Y_t$ of the held portion 83 as shown in FIG. 17B and FIG. 22. More specifically, in the present embodiment, the punch 81 is moved in a direction from the downstream end surface 11*b* toward the upstream end surface 11*a* of the base material 11, or a direction opposite to the pressing direction in Step S11. As the punch 81 is moved, the processing portion 82 is driven into the base material 11. More specifically, the tip end of the processing portion 82 is inserted into the lead hole 14. Meanwhile, the processing portion 82 slidably contacts the inner peripheral surface 14*a* of the lead hole 14 at the outer peripheral surface 82*a* near the intersection line D1, at which the outer peripheral surface 82*a* slidably contacts the guide hole 37. Thus, the processing portion 82 widens the lead hole 14 with the outer peripheral surface 82*a* other than the portion slidably contacting the guide hole 37. At that time, as the tip end of the processing portion 82 is inserted into the lead hole 14, a portion of the processing portion 82 pressing the base material 11 approaches the held portion 83, which is held by the guide 36. Meanwhile, a reaction force applied to the processing portion 82 by the base material 11 on a side opposite from a portion slidably contacting the lead hole 14 is offset by a reaction force applied to the processing portion 82 by the guide 36 at the portion slidably contacting the guide hole 37. Thus, the bending moment applied to the punch 81 is reduced, so the breakage of the punch 81 can be prevented.

Figure 23:
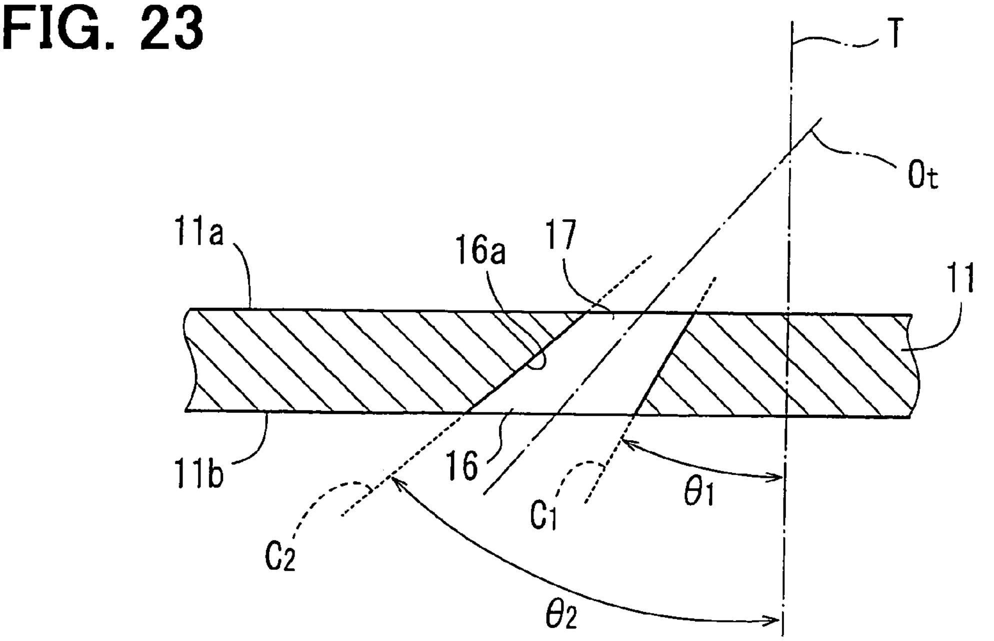
FIG. 23 is a cross-sectional view showing the base material formed with the taper hole according to the fifth embodiment.

As the lead hole 14 is widened until the processing portion 82 of the punch 81 punches out the base material 11, the taper hole 16 is formed in the shape complementing the shape of the outer peripheral surface 82*a* of the processing portion 82. More specifically, as shown in FIG. 23, the taper hole 16 is formed in a conical shape so that closed curves among intersection lines between a virtual plane, which is perpendicular to the central axis $O_t$ of the taper hole 16 inclined with respect to the thickness direction axis T of the base material 11, and the inner peripheral surface 16*a* are round in shape. Meanwhile, the taper hole 16 is formed in the conical shape, whose diameter increases in the direction from the upstream end surface 11*a* toward the downstream end surface 11*b* of the base material 11 along the extending direction of the central axis $O_t$ of the taper hole 16. In the present embodiment, two intersection lines C1, C2 between a cross section defined by a virtual plane, which includes the central axis $O_t$ of the taper hole 16 and is perpendicular to the end surfaces 11*a*, 11*b* of the base material 11, and the inner peripheral surface 16*a* of the taper hole 16 are inclined to the same side with respect to the thickness direction axis T of the base material 11. More specifically, two intersection lines C1, C2 between a cross section of the base material 11 in its thickness direction shown by a shaded area in FIG. 23 and the inner peripheral surface 16*a* of the taper hole 16 are inclined to the same side with respect to the thickness direction axis T of the base material 11. An inclination angle θ1 is provided between the intersection line C1 and the thickness direction axis T of the base material 11 therebetween as shown in FIG. 23. Another inclination angle. θ2 is provided between the intersection line C2 and the thickness direction axis T of the base material 11 therebetween as shown in FIG. 23.

Then, in Step S13 of the flowchart shown in FIG. 19, the straight hole 18 is formed in the base material 11 through the punch press.

Figure 24A:
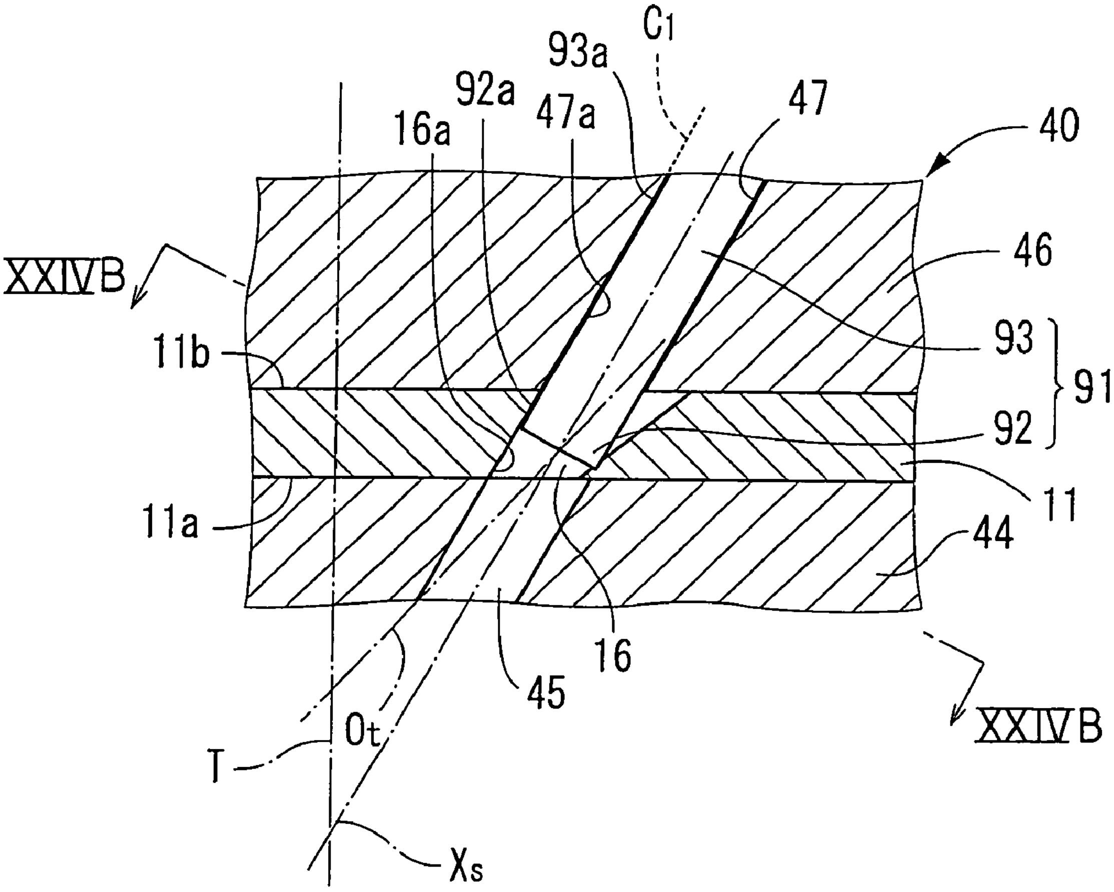
FIG. 24A is a cross-sectional view showing the straight hole forming machine according to the fifth embodiment.
Figure 24B:
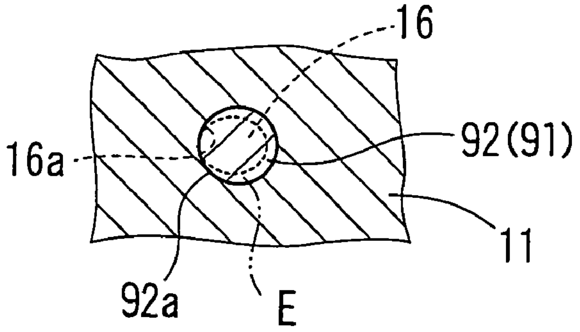
FIG. 24B is a cross-sectional view showing the straight hole forming machine of FIG. 24A taken along the line XXIVB-XXIVB.

Specifically, the straight hole 18 is formed by using a straight hole forming machine 40 having a punch 91, a die 44 and a guide 46 as shown in FIGS. 24A and 24B.

In the straight hole forming machine 40, the die 44 and the guide 46 respectively contact the upstream end surface 11*a* and the downstream end surface 11*b* of the base material 11 so that the die 44 and the guide 46 hold the base material 11 therebetween. The punch 91 is formed in the shape of a circular cylinder, whose diameter is substantially constant toward its tip end. An outline of a cross section (for instance, a cross section shown in FIG. 24B) perpendicular to a central axis $X_s$ of the punch 91 is round in shape. The external diameter of the punch 91 on the cross section perpendicular to the central axis $X_s$ of the punch 91 is set to be smaller than the internal diameter of the larger diameter opening of the taper hole 16 formed in Step S12. Meanwhile, the external diameter of the punch 91 on the cross section perpendicular to the central axis $X_s$ of the punch 91 is set to be larger than the internal diameter of the smaller diameter opening of the taper hole 16. A processing portion 92 is formed at a tip end of the punch 91 and a held portion 93 is formed on a portion of the punch 91 on the opposite side from the processing portion 92. The punch 91 is inserted into a guide hole 47 of the guide 46 and is held by at least an inner peripheral surface 47*a* of the guide 47, which slidably contacts an outer peripheral surface 93*a* of the held portion 93 throughout the periphery. Thus, the central axis $X_s$ of the punch 91 is inclined with respect to the thickness direction axis T of the base material 11 to the same side as the central axis $O_t$ of the taper hole 16 formed in the base material 11. An inclination angle of the central axis $X_s$ of the punch 91 is different from an inclination angle of the central axis $O_t$ of the taper hole 16. The punch 91 is guided in the extending direction of the central axis $X_s$. The punch 91 guided by the guide 46 is inserted into a pulling cavity 45 of the die 44 so that the punch 91 can move in a sliding manner.

Figure 17C:
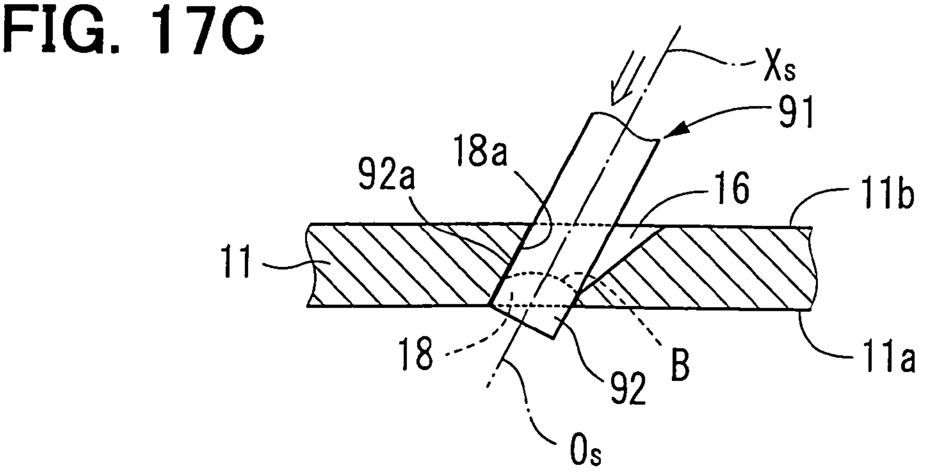
FIG. 17C is a schematic diagram showing a method for forming a straight hole with a straight hole forming machine according to the fifth embodiment.

In order to form the straight hole 18 by using the straight hole forming machine 40, the punch 91 is moved in the pressing direction from the larger diameter opening toward the smaller diameter opening of the taper hole 16 along the central axis $X_s$ of the punch 91 as shown in FIGS. 17C and 24A. As the punch 91 is moved, the processing portion 92 is inserted into the taper hole 16 from the large diameter opening of the taper hole 16. The outer peripheral surface 92*a* of the processing portion 92 slidably contacts the inner peripheral surface 16*a* of the taper hole 16 near the intersection line C1 so that the outer peripheral surface 92*a* except the contacting portion widens the smaller diameter opening of the taper hole 16. The smaller diameter opening of the taper hole 16 is widened until the processing portion 92 of the punch 91 punches out the base material 11. Thus, the straight hole 18 is formed in the shape complementing the shape of the outer peripheral surface 92*a* of the processing portion 92. More specifically, the straight hole 18 is formed in the shape of a cylinder, whose diameter is substantially constant in the extending direction of the central axis $O_s$. Meanwhile, closed curves among the intersection lines between a virtual plane, which is perpendicular to the central axis $O_s$ of the straight hole 18 inclined with respect to the thickness direction axis T of the base material 11, and the inner peripheral surface 18*a* are round in shape. The inner peripheral surface 18*a* of the thus formed straight hole 18 connects to the remaining portion of the inner peripheral surface 16*a* of the taper hole 16, where the straight hole 18 is not formed, on the boundary line B. Thus, the injection hole 12 is formed by the straight hole 18 and the taper hole 16.

An opening area of the smaller diameter opening 17 of the taper hole 16, which opens into the upstream end surface 11*a* of the base material 11 as shown in FIG. 23 before the process in Step S13, is prone to vary due to variation in the stroke of the processing portion 82 as the taper punch. However, in the present embodiment, by performing the process in Step S13, the small diameter side opening 17 can be changed into the straight hole 18 as shown in FIG. 18. The opening area of the straight hole 18 is almost independent of the stroke of the processing portion 92 as the straight punch. Therefore, variation in fuel injection quantity injected from the injection hole 12 provided by the straight hole 18 and the taper hole 16 can be reduced, and variation among products in the fuel injection quantity injected from the injection hole 12 can be reduced.

In Step S11, the lead hole 14 is formed in the base material 11. Therefore, the burrs can be formed in a portion 19 of the opening of the lead hole 14 on a forward side with respect to the pressing direction in FIG. 21. However, in the present embodiment, the pressing direction in Step S12 is set to be opposite from the pressing direction in Step S11. Therefore, even if the burrs are formed at the portion 19 of the opening of the lead hole 14, the portion 19 of the opening of lead hole 14 can be finely formed by a larger diameter end of the processing portion 82 as the taper punch.

In Step S13, the pressing direction is set to be the direction from the large diameter opening toward the smaller diameter opening of the taper hole 16. Therefore, even if excess material forms the burrs in the punch press, the burrs will protrude to the outside from the straight hole 18. The protruding burrs can be easily eliminated through grinding and the like after Step S13.

Sixth Embodiment

Next, a method for forming a straight hole 18 with a straight hole forming machine 40 according to the sixth embodiment will be explained based on FIGS. 25A and 25B.

In the method according to the sixth embodiment, the straight hole 18 is formed with the straight hole forming machine 40 having a punch 101 instead of the punch 91 of the fifth embodiment in a step corresponding to Step S13 of the fifth embodiment. The punch 101 is formed in the shape of a cylinder, whose diameter is substantially constant toward its tip end like the punch 91 of the fifth embodiment as shown in FIG. 25A. However, an outline of the punch 101 on a cross section perpendicular to its central axis $X_s$ (for instance, a cross section shown in FIG. 25B) is elliptic in shape unlike the punch 91 of the fifth embodiment. On the cross section perpendicular to the central axis $X_s$, the major axis of the outline of the punch 101 is provided on a virtual plane, which includes the central axis $X_s$ and is perpendicular to the end surfaces 11*a*, 11*b* of the base material 11. More specifically, the major axis of the outline of the punch 101 on the cross section perpendicular to the central axis $X_s$ is provided on a virtual plane shown by a shaded area in FIG. 25A. The external diameters of the major axis and the minor axis of the punch 101 on the cross section perpendicular to the central axis $X_s$ are set to be smaller than the larger diameter opening of the taper hole 16 formed in a step corresponding to Step S12 of the fifth embodiment. Meanwhile, the external diameters of the major axis and the minor axis of the punch 101 on the cross section perpendicular to the central axis $X_s$ are set to be larger than the smaller diameter opening of the taper hole 16.

The punch 101 is formed with a processing portion 102 and a held portion 103, which correspond to the processing portion 92 and the held portion 93 of the fifth embodiment respectively. The punch 101 is inserted into the guide hole 47 and is held at least by the inner peripheral surface 47*a* of the guide hole 47, which slidably contacts an outer peripheral surface 103*a* of the held portion 103 throughout the periphery. Thus, the central axis $X_s$ of the punch 101 is inclined to the same side as the central axis $O_t$ of the taper hole 16 formed in the base material 11 with respect to the thickness direction axis T of the base material 11 held between the die 44 and the guide 46. An inclination angle of the central axis $X_s$ of the punch 101 is different from that of the central axis $O_t$ of the taper hole 16. The punch 101 is guided along the extending direction of the central axis $X_s$. The punch 101 guided by the guide 46 is inserted into the pulling cavity 45 of the die 44 so that the punch 101 can move in a sliding manner.

Figure 25A:
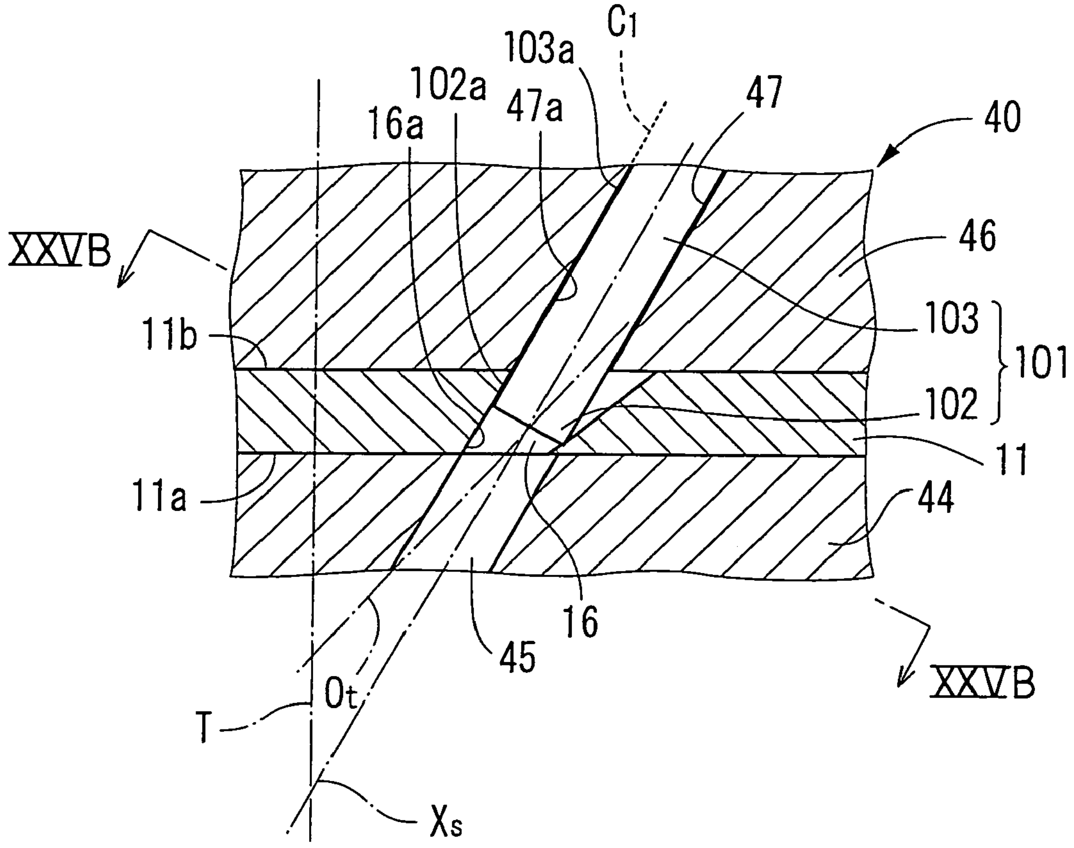
FIG. 25A is a cross-sectional view showing a straight hole forming machine according to a sixth embodiment of the present invention.
Figure 25B:
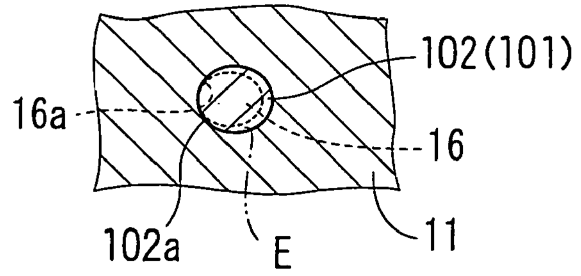
FIG. 25B is a cross-sectional view showing the straight hole forming machine of FIG. 25A taken along the line XXVB-XXVB.
Figure 26:
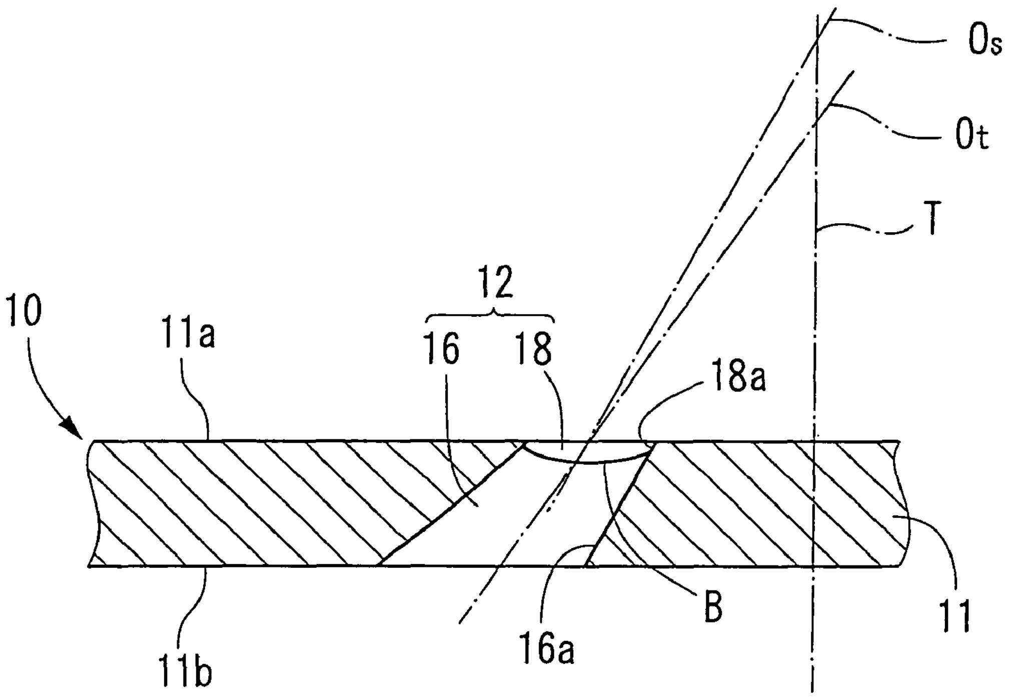
FIG. 26 is a cross-sectional view showing an injection hole member according to the sixth embodiment.

In order to form the straight hole 18 with the straight hole forming machine 40 having the punch 101, the punch 101 is moved in the pressing direction from the larger diameter opening to the smaller diameter opening of the taper hole 16 along the central axis $X_s$ of the punch 101 as shown in FIG. 25A. As the punch 101 is moved, the processing portion 102 is inserted into the taper hole 16 from the larger diameter opening of the taper hole 16. The outer peripheral surface 102*a* of the processing portion 102 slidably contacts the inner peripheral surface 16*a* of the taper hole 16 near the intersection line C1 like the fifth embodiment as shown in FIG. 25A. The other portion of the outer peripheral surface 102*a* of the processing portion 102 than the slidably contacting portion widens the taper hole 16 until the processing portion 102 of the punch 101 punches out the base material 11. Thus, the straight hole 18 is formed in the shape complementing the shape of the outer peripheral surface 102*a* of the processing portion 102. More specifically, the straight hole 18 is formed in the shape of a cylindrical hole whose inner diameter is substantially constant in the extending direction of the central axis $O_s$ of the straight hole 18 as shown in FIG. 26. Meanwhile, closed curves among the intersection lines between a virtual plane, which is perpendicular to the central axis $O_s$ inclined with respect to the thickness direction axis T of the base material 11, and the inner peripheral surface 18*a* of the straight hole 18 are elliptic in shape. The inner peripheral surface 18*a* of the straight hole 18 connects to the inner peripheral surface 16*a* of the remaining taper hole 16 on the boundary line B. Thus, the injection hole 12 is provided by the straight hole 18 and the taper hole 16.

Next, comparison between the fifth embodiment and the sixth embodiment will be given.

The punch 101 having the cross section in the elliptic shape is used in the sixth embodiment. Therefore, the protruding degree of the boundary line B provided by the inner peripheral surfaces 18*a*, 16*a* toward the taper hole 16 as shown in FIG. 26 can be reduced compared to the protruding degree provided in the case where the punch 91 of the fifth embodiment having the cross section in the round shape is used as shown in FIG. 18. More specifically, the length of the straight hole 18 can be contracted in the extending direction of the central axis $O_s$. It is because the central axis $X_s$ of the punch 101, which coincides with the axis of the pressing direction, is inclined with respect to the central axis $O_t$ of the taper hole 16, so an area E widened through the punch press is contracted in the case of the punch 101 having the elliptic cross section as shown in FIG. 25B, compared to the case of the punch 91 having the round cross section as shown in FIG. 24B. As the length of the straight hole 18 is contracted, the length of the taper hole 16 is extended. As a result, the decrease in the effect of minimizing the diameters of the droplets of the spray due to the formation of the straight hole 18 can be inhibited sufficiently.

Figure 27A:
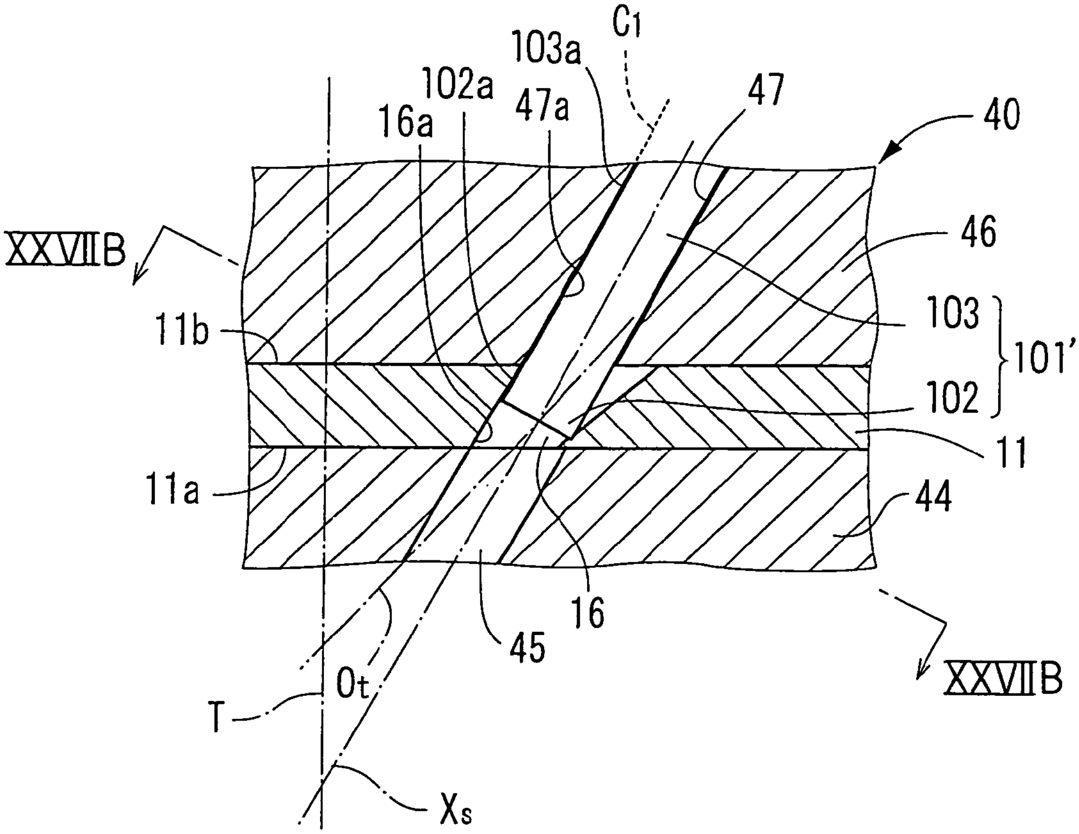
FIG. 27A is a cross-sectional view showing a straight hole forming machine according to a modified example of the sixth embodiment.
Figure 27B:
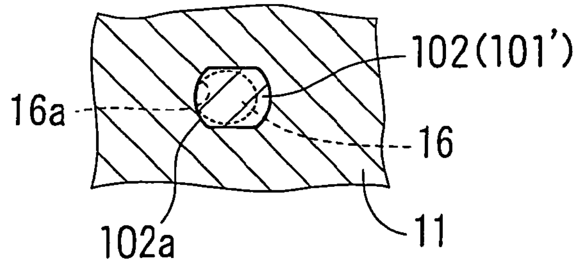
FIG. 27B is a cross-sectional view showing the straight hole forming machine of FIG. 27A taken along the line XXVIIB-XXVIIB.

In FIGS. 27A and 27B, a modified example of the straight hole forming machine 40 of the sixth embodiment is shown. The straight hole forming machine 40 shown in FIGS. 27A and 27B has a cylindrical punch 101', whose diameter is substantially constant toward its tip end. An outline of the cylindrical punch 101' on the cross section perpendicular to the central axis $X_s$ takes the shape defined by two parallel lines joined by semi-circular ends as shown in FIG. 27B. In the case where the straight hole 18 is formed with the punch 101', the major axis of the outline of the punch 101' on the cross section perpendicular to the central axis $X_s$ is provided on a virtual plane, which includes the central axis $X_s$ and is perpendicular to the end surfaces 11*a*, 11*b* of the base material 11 held between the die 44 and the guide 46. More specifically, the major axis of the outline of the punch 101 on the cross section perpendicular to the central axis $X_s$ is provided on a virtual plane defining the cross section shown by a shaded area in FIG. 27A.

In the fifth and sixth embodiments, the pressing direction for forming the taper hole 16 is set to be opposite to the pressing direction for forming the lead hole 14. Alternatively, the pressing direction for forming the taper hole 16 may be set to the same direction as the pressing direction for forming the lead hole 14. In the fifth and sixth embodiments, the central axis $Y_t$ of the held portion 83, which coincides with the axis of the pressing direction, is inclined with respect to the thickness direction axis T of the base material 11. The central axis $X_t$ of the processing portion 82 as the taper punch is inclined with respect to the central axis $Y_t$ toward an opposite side from the base material 11. Alternatively, the axis $Y_t$ of the pressing direction may be inclined with respect to the thickness direction axis T of the base material 11 so that the pressing direction axis $Y_t$ coincides with the central axis $X_t$ of the processing portion 82 or is parallel to the central axis $X_t$. Alternatively, the pressing direction axis $Y_t$ may be parallel to the thickness direction axis T of the base material 11 and the central axis $X_t$ of the processing portion 82 may be inclined with respect to the pressing direction axis $Y_t$. In these cases, the central axis $O_t$ of the taper hole 16 becomes inclined with respect to the thickness direction axis T of the base material. Both the pressing direction axis $Y_t$ and the central axis $X_t$ of the processing portion 82 may be parallel to the thickness direction axis T of the base material 11. In this case, the central axis $O_t$ of the taper hole 16 becomes parallel to the thickness direction axis T of the base material 11, too.

In the fifth and sixth embodiments, the central axis $X_s$ of the processing portion 92, 102 as the straight punch is inclined with respect to the central axis $O_t$ of the taper hole 16. The pressing direction for forming the straight hole is set along the central axis $X_s$. Alternatively, the central axis $X_s$ of the processing portion 92, 102 may coincide with the central axis $O_t$ of the taper hole 16 or may be parallel to the central axis $O_t$. In this case, the central axis $O_t$ of the taper hole 16 and the central axis $O_s$ of the straight hole 18 coincide with each other or are parallel to each other. The pressing direction for forming the straight hole is set to the direction from the larger diameter opening toward the smaller diameter opening of the taper hole 16. Alternatively, the pressing direction for forming the straight hole may be set to an opposite direction, or the direction from the smaller diameter opening toward the larger diameter opening of the taper hole 16.

Seventh Embodiment

Figure 29:
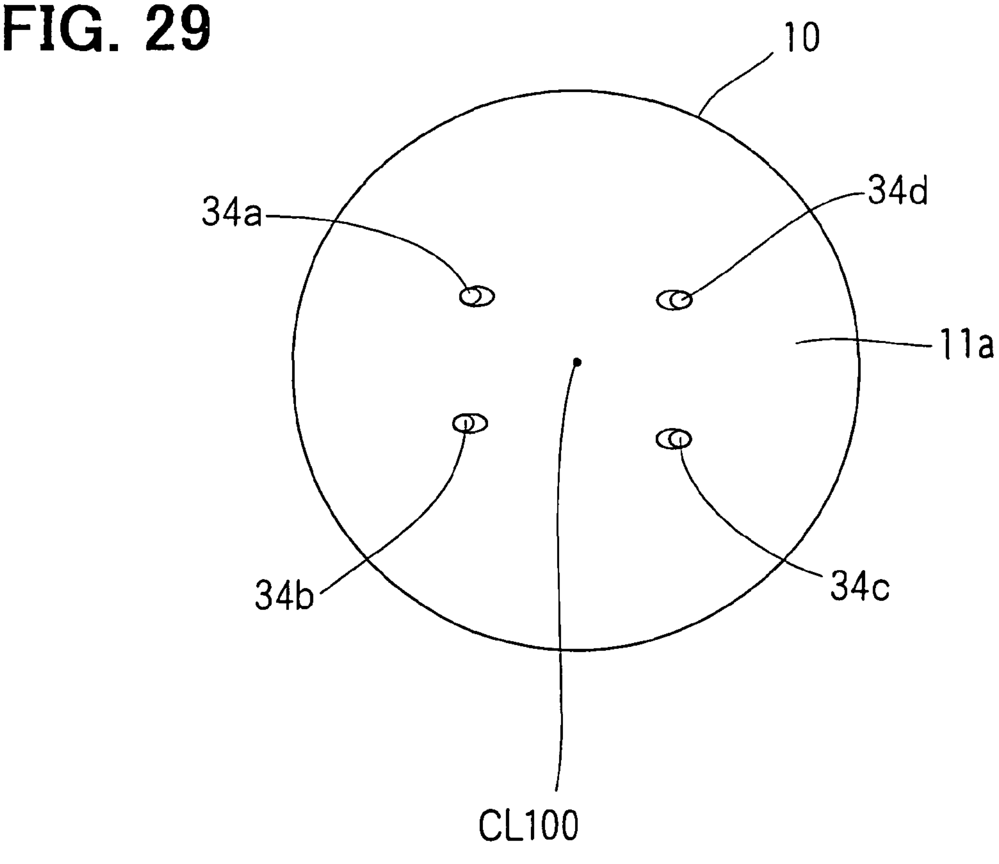
FIG. 29 is a diagram showing an upstream end surface of the injection hole member according to the seventh embodiment.
Figure 30:
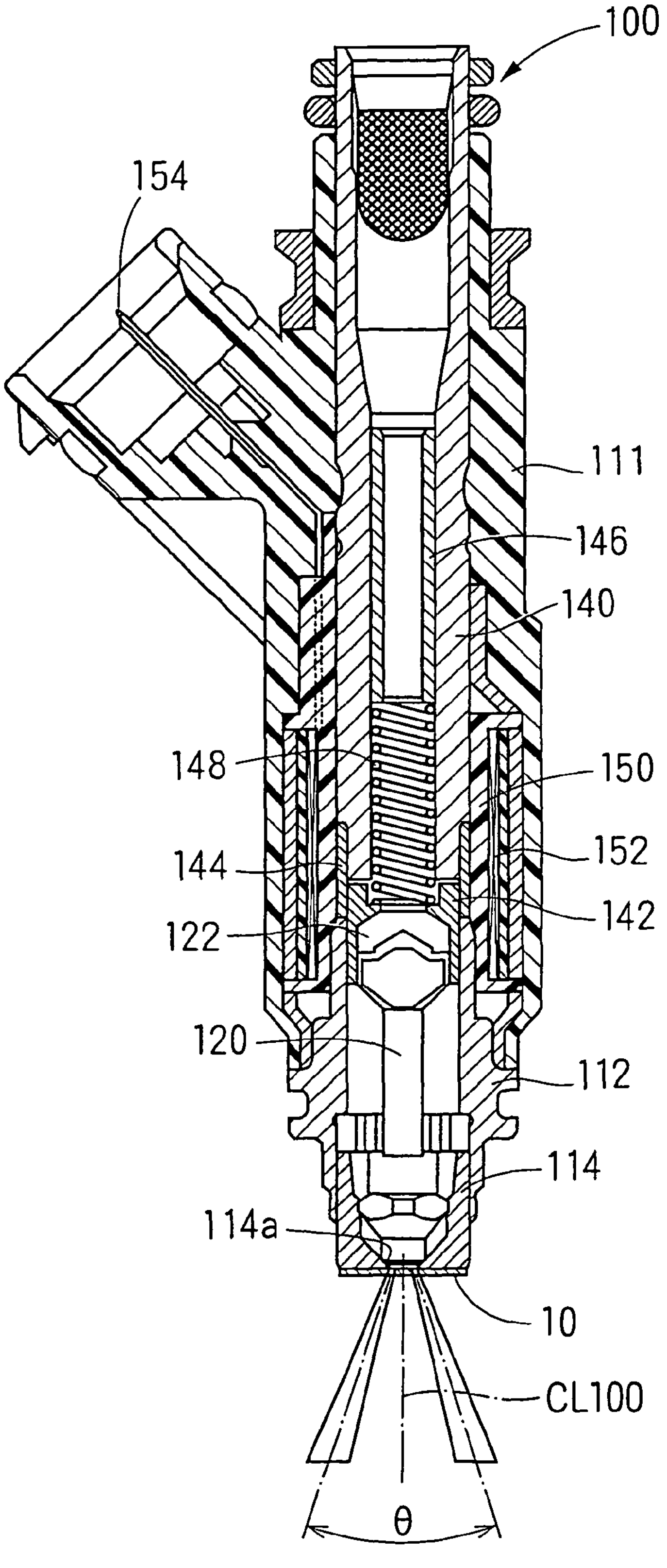
FIG. 30 is a cross-sectional view showing an injector having the injection hole member according to the seventh embodiment.

Next, a method for manufacturing an injection hole member 10 according to the seventh embodiment will be explained based on FIGS. 28 to 34. As shown in FIG. 29, the injection hole member 10 of the seventh embodiment is a circular plate formed of metallic material such as stainless steel with four injection holes 34*a*, 43*b*, 34*c*, 34*d*. The spray injected from the injection holes 34*a*, 34*b* flows in a direction opposite to a direction of a flow of the spray injected from the other injection holes 34C, 34*d*. Thus, the injector 100 performs the injection in two directions as shown in FIG. 30. As the entire injection holes 34*a*, 34*b*, 34*c*, 34*d* are formed in the same shape, a following explanation of one injection hole 34*a* also apply to the other injection holes 34*b*, 34*c*, 34*d*.

Figure 28:
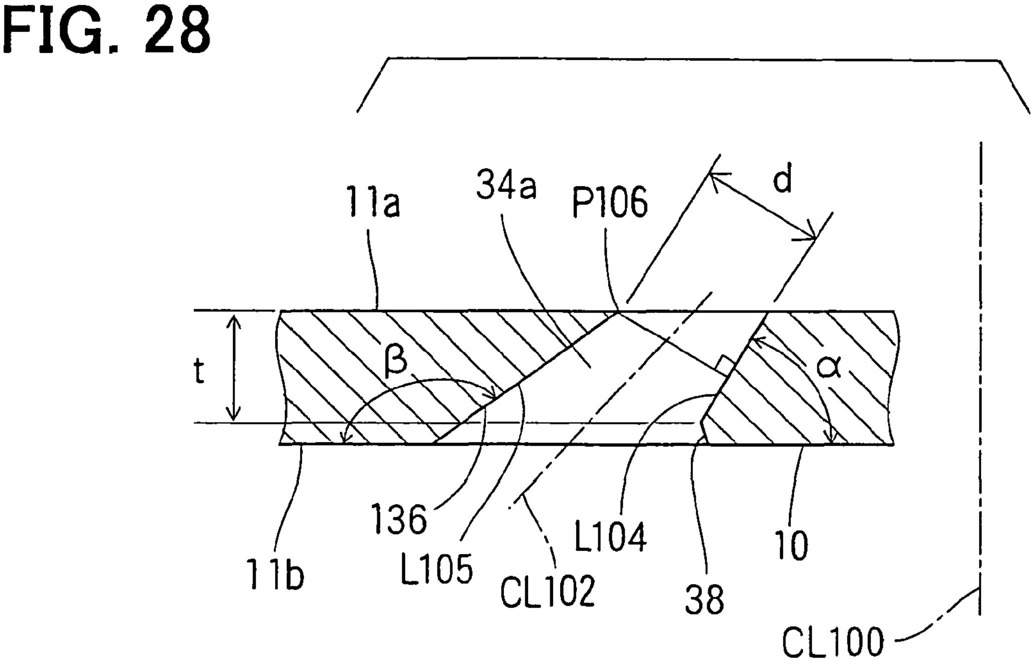
FIG. 28 is a cross-sectional view showing an injection hole member according to a seventh embodiment of the present invention.

As shown in FIG. 28, the injection hole 34*a* is a taper hole whose internal diameter increases along a direction from its upstream opening (an inlet) toward its downstream opening (an outlet). An injection hole axis CL102, or a central axis, of the injection hole 34*a* is inclined with respect to a central axis CL100 of the injection hole member 10. The injection hole axis CL102 is directed along the injection direction in which the injection hole axis CL102 separates from the central axis CL100.

In two intersection lines between a virtual plane, which includes the injection hole axis CL102 and is perpendicular to the injection hole member 10, and an inner peripheral surface 136 providing the injection hole 34*a*, a first injection hole intersection line L104, which is closer to the central axis CL100, and a downstream end surface 11*b* of the base material 11 provide an acute angle α therebetween as shown in FIG. 28. To the contrary, a second injection hole intersection line L105 and the downstream end surface 11*b* of the base material 11 provide a blunt angle β therebetween as shown in FIG. 28. A concave portion 38 is formed in an edge of the downstream opening of the injection hole 34*a* on the first injection hole intersection line L104 side. The concave portion 38 caves in radially outward from the inner peripheral surface 136 of the injection hole 34*a* as shown in FIG. 28. More specifically, the concave portion 38 is formed on a radially inner side of the edge of the downstream end of the injection hole 34*a* with respect to the central axis CL100.

The fuel flowing into the injection hole 34*a* from the upstream end surface 11*a* side is mainly introduced to the inner peripheral surface 136 on the first injection hole intersection line L104 side, which provides the acute angle α with the downstream end surface 11*b*. Then, the fuel flows while spreading along the inner peripheral surface 136. Since the concave portion 38 caves in radially outward from the inner peripheral surface 136, little or no fuel flows along the concave portion 38. The direction of the spray injected from the injection hole 34*a* changes in accordance with the length of the inner peripheral surface 136 except the concave portion 38. Therefore, the thickness of the inner peripheral surface 136 on the first injection hole intersection line L104 side except the concave portion 38 serves as an effective thickness t, which is a substantial thickness of the injection hole member 10 for changing the injection direction of the spray. An injection hole diameter d of the injection hole 34*a* is represented by a distance between an intersection point P106, which is provided between the second injection hole intersection line L105 and the upstream end surface 11*a*, and the first injection hole intersection line L104.

Figure 31:
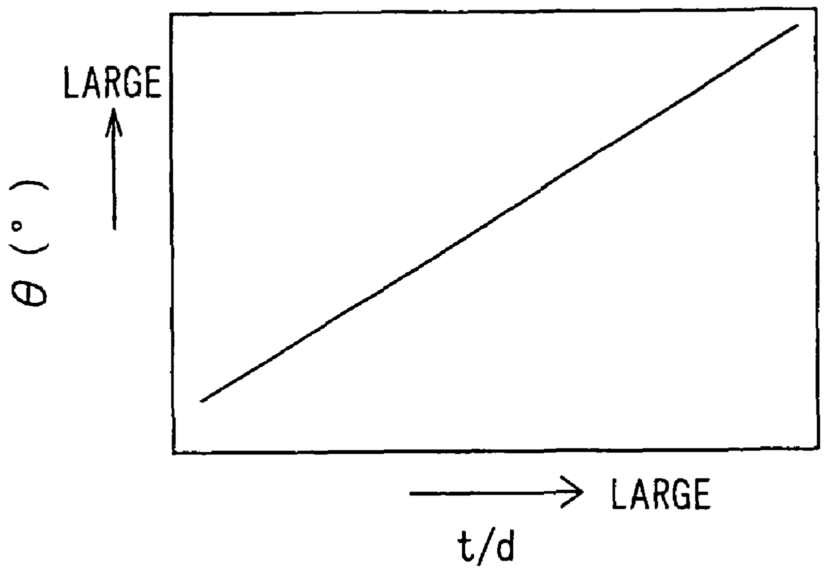
FIG. 31 is a graph showing a relationship between a ratio t/d and a spray angle θ.
Figure 32:
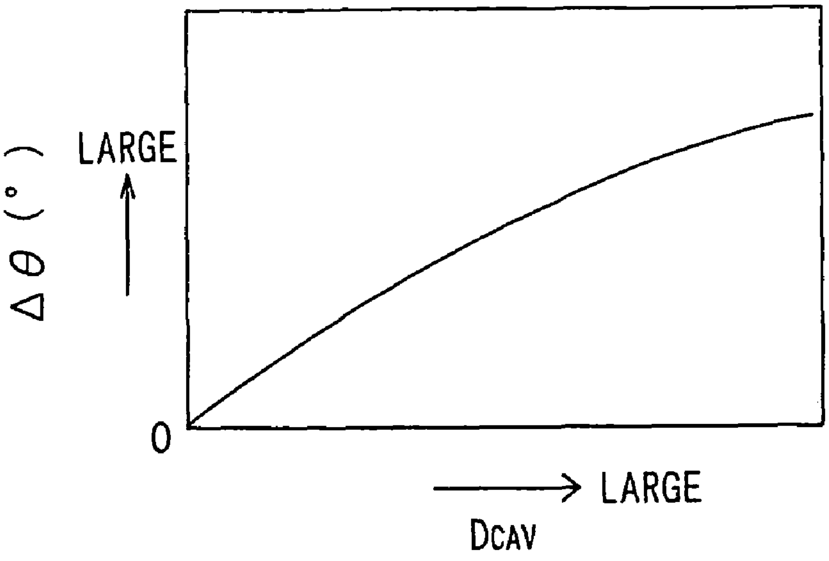
FIG. 32 is a graph showing a relationship between a processing degree of a concave portion and a decrease in the spray angle θ.

If the effective thickness t is changed by changing the size of the concave portions 38, the injection directions of the respective injection holes 34*a*, 34*b*, 34*c*, 34*d* are changed. Accordingly, the injection angle of the spray injected from the injection holes 34*a*, 34*b* and the injection angle of the spray injected from the other injection holes 34*c*, 34*d* are changed. Meanwhile, the spray angle θ provided between the spray injected from the injection holes 34*a*, 34*b* and the spray injected from the other injection holes 34*c*, 34*d* is changed. If the inclination angle of the injection hole axis CL102 of each injection hole is constant with respect to the central axis CL100, the spray angle θ changes substantially in proportion to a ratio of the effective thickness t of the injection hole member 10 to the injection hole diameter d (t/d) as shown in FIG. 31. If the injection hole diameter d is constant, the injection angle of the spray injected from each injection hole increases as the effective thickness t of the injection hole member 10 is increased. Therefore, the spray angle θ increases as the effective thickness t of the injection hole member 10 is increased. If the injection hole diameter d is constant, the injection angle of the spray injected from each injection hole decreases as the effective thickness t is decreased. Therefore, the spray angle θ also decreases as the effective thickness t is decreased. The effective thickness t can be regulated with the size of the concave portion 38. The effective thickness t is substantially reduced if the concave portion 38, which caves in radially outward from the inner peripheral surface 136, is formed on the edge of the downstream end opening of each injection hole on the first injection hole intersection line L104 side. The effective thickness t is reduced as a processing degree Dcav of the concave portion 38 is increased and the concave portion 38 is deepened. As a result, as shown in FIG. 32, as the processing degree Dcav of the concave portion 38 is increased, a decrease Δθ in the spray angle θ is increased. More specifically, as the processing degree Dcav of the concave portion 38 is increased, the spray angle θ is decreased.

Next, a method for manufacturing the injection hole member 10 according to the seventh embodiment will be explained based on FIGS. 33A to 33D. In FIGS. 33A to 33D, the base material 11 is shown so that the upstream end surface 11*a* faces downward and the downstream end surface 11*b* faces upward.

Figure 33A:
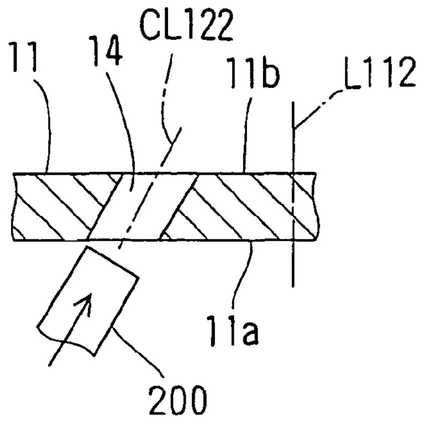
FIG. 33A is a schematic diagram showing a method for forming a lead hole with a lead hole forming machine according to the seventh embodiment.

First, in a lead hole forming step, a lead hole 14 is punched in the base material 11 with a lead hole punch 200 so that a central axis CL122 of the lead hole 14 is inclined with respect to an axis L112 of the base material 11 in its thickness direction as shown in FIG. 33A. The lead hole punch 200 is a straight punch, whose punch diameter is constant.

Figure 33B:
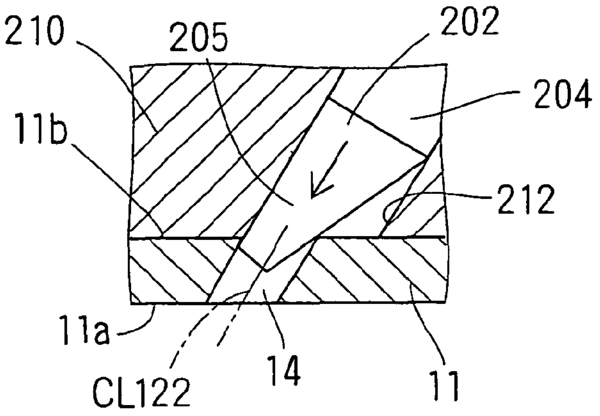
FIG. 33B is a schematic diagram showing a method for forming a taper hole with a taper hole forming machine according to the seventh embodiment.

Then, in an injection hole forming step, a guide 210 of a taper punch 202 is set on the downstream end surface 11*b* side of the base material 11 as shown in FIG. 33B. A guide surface 212 of the guide 210 guides a large diameter portion 204 of the taper punch 202. The taper punch 202 has the large diameter portion 204 in the shape of a cylinder, whose diameter is constant, and a taper portion 205 formed on an end of the large diameter portion 204. The diameter of the taper portion 205 decreases toward its tip end.

As shown in FIG. 33B, the taper punch 202 is inserted into the lead hole 14 from the downstream end side of the lead hole 14 along the central axis CL122 of the lead hole 14 in a direction opposite to the punching direction of the lead hole punch 200. Thus, the taper punch 202 punches out the base material 11 in a direction opposite to the punching direction of the lead hole punch 200. Thus, the taper punch 202 widens the lead hole 14, so the injection hole 34*a* as the taper hole whose diameter increases in a direction from the upstream end opening toward the downstream end opening is formed.

Figure 33C:
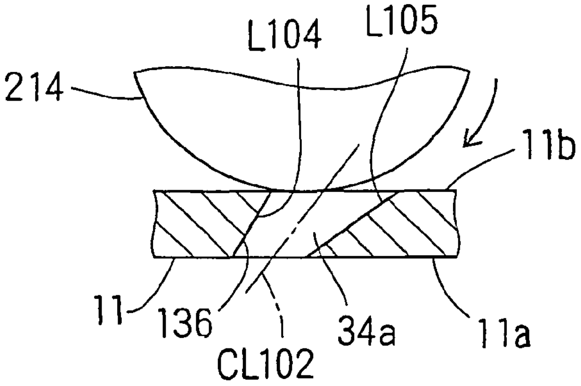
FIG. 33C is a schematic diagram showing a method for forming the concave portion with a brush according to the seventh embodiment.

Then, in a concave portion forming step, as shown in FIG. 33C, the edge of the downstream end opening of the injection hole 34*a* on the first injection hole intersection line L104 side is ground with a circular brush 214, which includes abrasive grains.

Figure 33D:
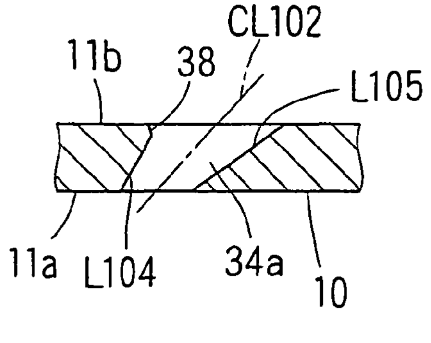
FIG. 33D is a cross-sectional view showing an injection hole member according to the seventh embodiment.

Thus, as shown in FIG. 33D, the concave portion 38 caving in radially outward from the inner peripheral surface 136 is formed in the edge of the downstream end opening of the injection hole 34*a* on the first injection hole intersection line L104 side. More specifically, the concave portion 38 is formed on a radially inner side of the edge of the downstream end of the injection hole 34*a* with respect to the central axis CL100 of the base material 11.

Through the grinding process with the brush 214, the size of the concave portion 38 can be regulated highly accurately without deforming the injection hole 34*a*. Therefore, the spray angle θ can be regulated highly accurately and easily by regulating a grinding degree with the brush 214.

The lead hole 14 is formed with the lead hole punch 200 before the injection hole 34*a* is formed with the taper punch 202. The taper punch 202 widens the lead hole 14 after the tip end of the taper punch 202 is inserted into the lead hole 14. Therefore, a distance between a holding point where the guide 210 holds the taper punch 202 and a pressing point where the taper punch 202 widens the lead hole 14 is contracted. Accordingly, bending moment applied to the taper punch 202 is reduced, so the breakage of the taper punch 202 can be prevented.

The taper punch 202 is inserted into the lead hole 14 in a direction opposite to the inserting direction of the lead hole punch 200. Therefore, even if the burrs are formed on the edge of the downstream end opening of the lead hole 14 when the base material is pressed with the lead hole punch 200, the burrs can be eliminated with the taper punch 202.

In the seventh embodiment, the lead hole 14 is formed with the lead hole punch 200. Alternatively, the lead hole 14 may be formed through an electric discharging process, for instance. In the seventh embodiment, the injection holes 34*a*, 34*b*, 34*c*, 34*d* are formed with the taper hole 202 after the lead holes 14 are formed. Alternatively, the injection holes 34*a*, 34*b*, 34*c*, 34*d* may be formed with the taper punch 202 directly without forming the lead holes 14. The concave portion 38 may be formed with a punch, instead of the brush 214.

There is a possibility that the injection angle of the fuel spray injected from the injection hole formed in the processes shown in FIGS. 33A and 33B has been already smaller than a target range before the concave portion 38 is formed in the concave portion forming step shown in FIG. 33C because of the deviation in a setting value of the inclination angle of the injection hole, variation in the thickness of the base material 11 or processing errors. If the injection angle is smaller than the target range, the injection angle cannot be regulated within the target range by forming the concave portion 38. In the case where the injector 100 performs the two direction spray as shown in FIG. 30, the spray angle θ cannot be regulated within the target range by forming the concave portion 38 if the spray angle θ is smaller than the target range before the concave portion 38 is formed.

Figure 34:
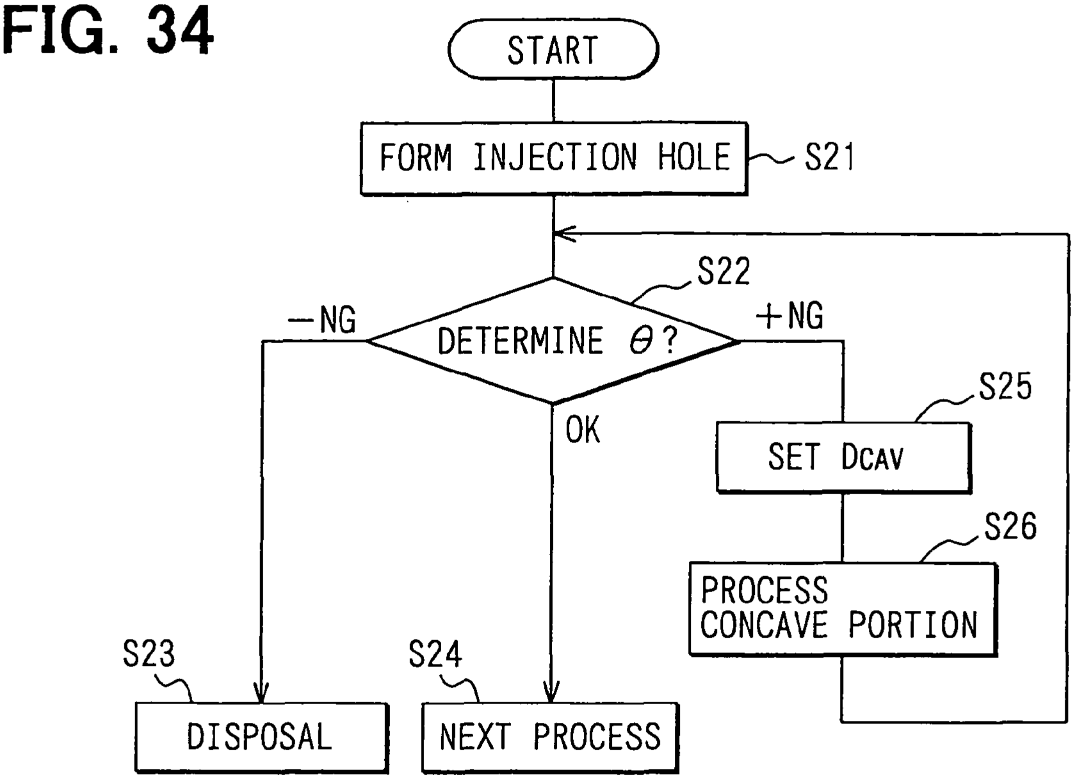
FIG. 34 is a flowchart showing a method for regulating the spray angle according to the seventh embodiment.

Therefore, the injection angle or the spray angle of the injection hole should be preferably regulated based on a flowchart shown in FIG. 34. In an explanation below, a regulating method of the spray angle θ is explained. The method can be applied to the regulation of the injection angle of the injection hole. In this case, the spray angle θ is replaced with the injection angle.

First, in an injection hole forming step of Step S21 of the flowchart shown in FIG. 34, the inclination angle of the injection hole 34*a* is set and the injection hole 34*a* is formed in the processes shown in FIGS. 33A and 33B so that the spray angle θ becomes larger than the target range before the concave portion 38 is formed in the concave portion forming step shown in FIG. 33C. More specifically, the setting angle of the injection hole 34*a* at the time when the concave portion 38 is formed is set to be larger than the inclination angle capable of providing the target spray angle range, before the concave portion 38 is formed.

Then, in a measuring step of Step S22 of the flowchart shown in FIG. 34, the spray angle θ is measured by injecting experimental fluid from the respective injection holes 34*a*, 34*b*, 34*c*, 34*d*. If the spray angle θ is smaller than the target range (−NG), the injection hole member is disposed of as a defective product in Step S23. If the spray angle θ is within the target range (OK), the process shown in FIGS. 33A to 33D is ended and the next process is performed in Step S24.

If the spray angle θ is larger than the target range (+NG), a processing step (Step S25 and Step S26) is performed. In the processing step, processing conditions such as pressing force of the brush 214 are set in accordance with a difference between the measured spray angle θ and the target range in Step S25. Thus, the processing degree Dcav of the concave portion 38 is regulated in Step S25. The concave portion 38 is formed based on the regulated processing degree Dcav in Step S26. Then, operation returns to Step S22. Also in the case where the punch is used to form the concave portion 38 instead of the brush 214, the processing degree Dcav of the concave portion 38 is regulated by setting the processing conditions such as a pressing force of the punch.

The above measuring step and the processing step are included in a concave portion forming step. Thus, the spray angle θ is regulated into the target range by repeating the measuring step and the processing step, while giving a feedback from the measured spray angle θ to the processing degree Dcav of the concave portion 38. Thus, the possibility that the spray angle θ may become less than the target range and the injection hole member 10 may become defective can be reduced. Moreover, the injection hole can be processed highly accurately so that the target spray angle θ is achieved.

Figure 35A:
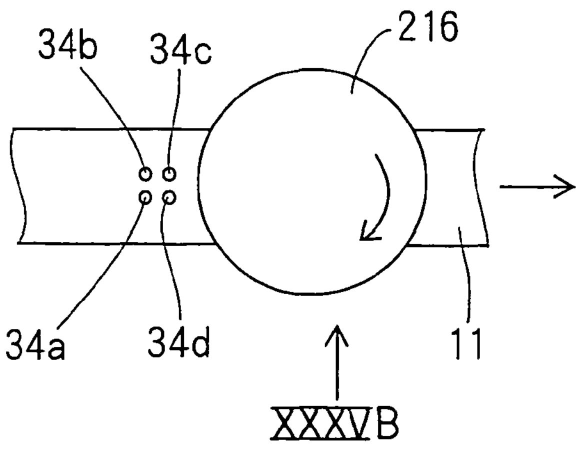
FIG. 35A is a diagram showing a grinding method of the injection hole member according to a modified example of the seventh embodiment.
Figure 35B:
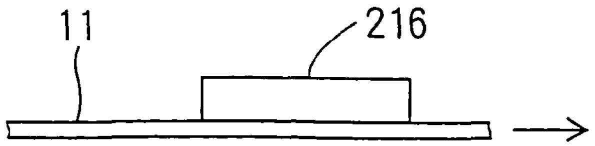
FIG. 35B is a diagram showing the injection hole member of FIG. 35A taken in a direction of an arrow mark XXXVB.

In the seventh embodiment, the concave portion 38 is formed only in the edge of the downstream end opening on the first injection hole intersection line L104 side of each injection hole with the use of the circular brush 214. Alternatively, as shown in FIGS. 35A and 35B, the concave portion may be formed in the entire portion of the edge of the downstream end opening of each injection hole by rotating a brush 216 in the shape of a circular plate and by grinding the base material 11 formed with the injection holes 34*a*, 34*b*, 34*c* 34*d* with a flat surface of the brush 216.

Eighth Embodiment

Figure 36:
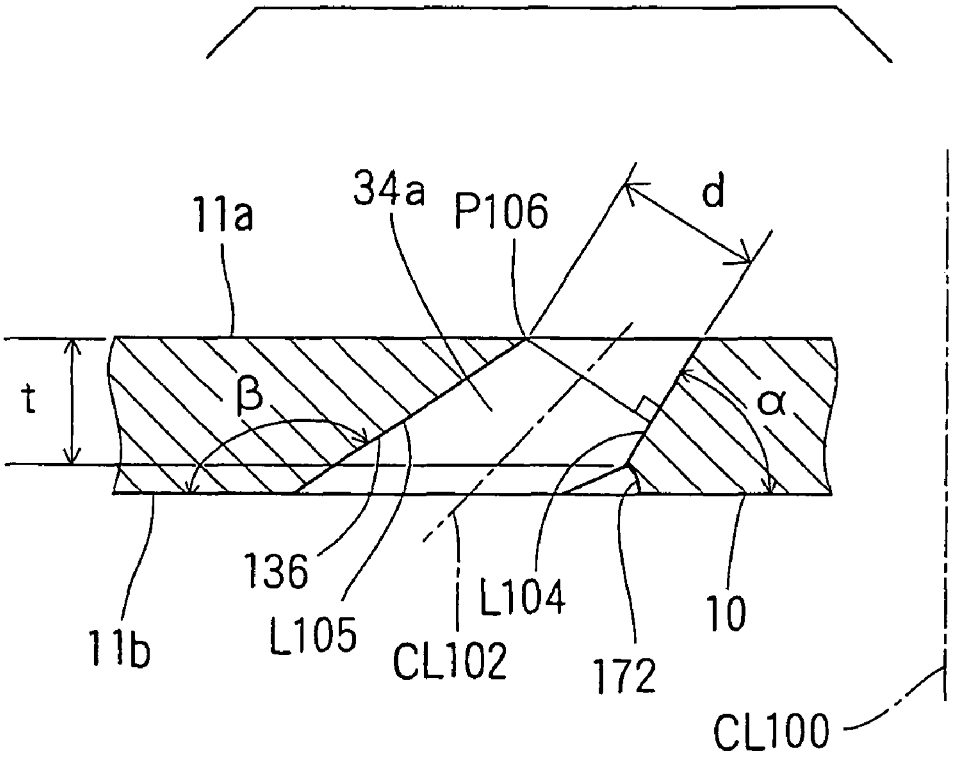
FIG. 36 is a cross-sectional view showing an injection hole member according to an eighth embodiment of the present invention.
Figure 37A:
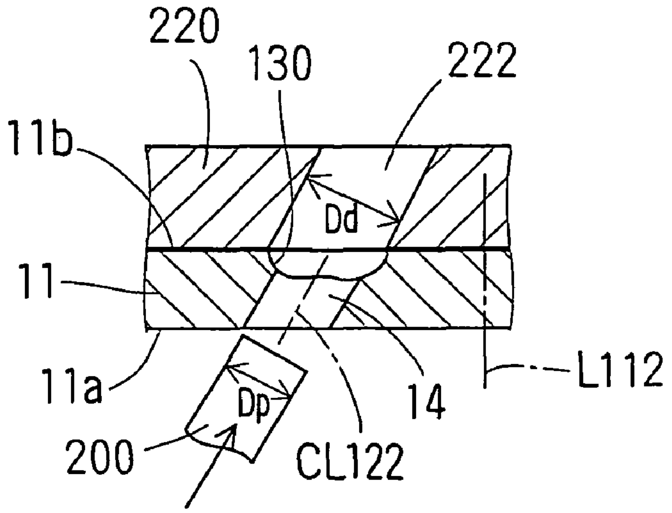
FIG. 37A is a diagram showing a method for forming a straight hole with a straight hole forming machine according to the eighth embodiment.
Figure 37B:
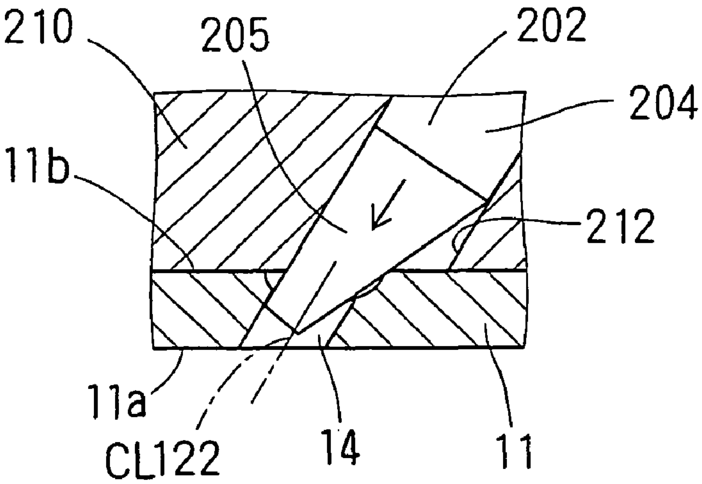
FIG. 37B is a diagram showing a method for forming a taper hole with a taper hole forming machine according to the eighth embodiment.
Figure 37C:
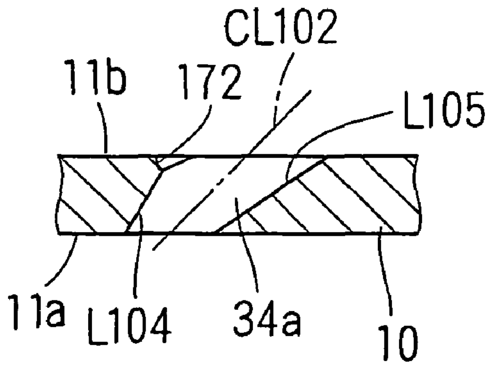
FIG. 37C is a cross-sectional view showing the injection hole member according to the eighth embodiment.
Figure 38A:
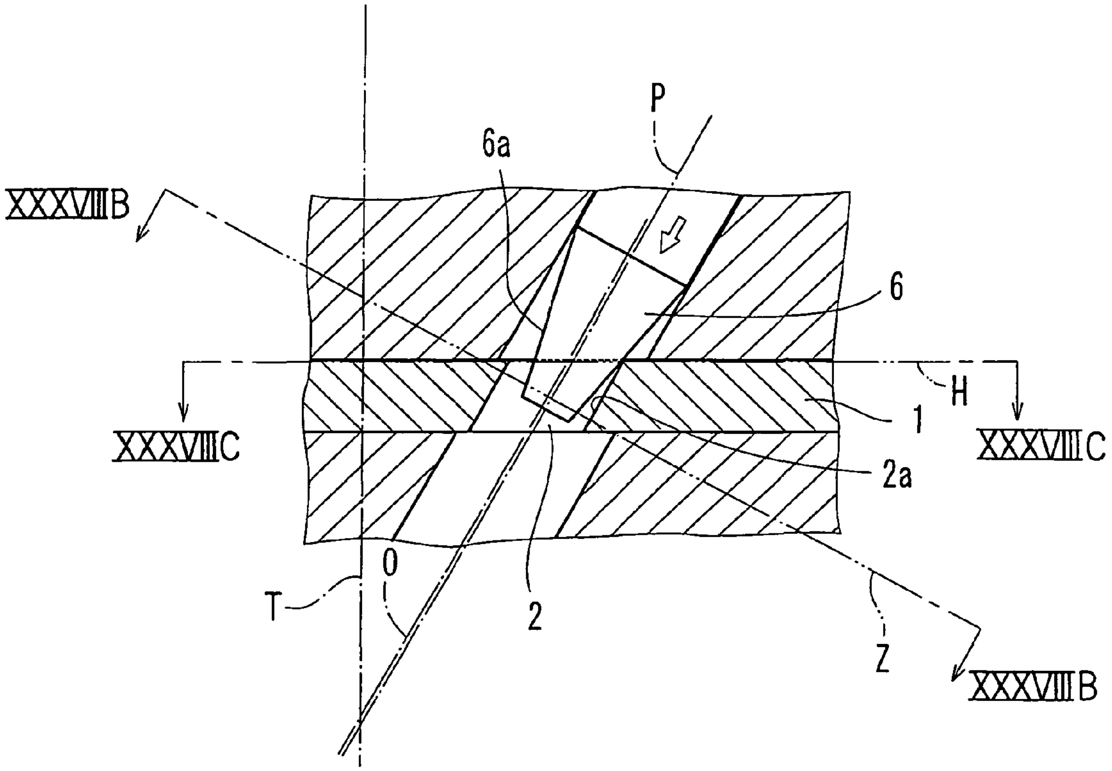
FIG. 38A is a cross-sectional view showing a taper hole forming machine of a related art.
Figure 38B:
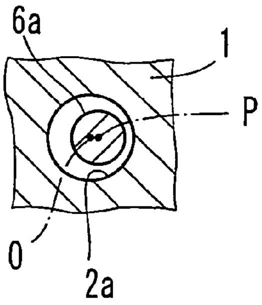
FIG. 38B is a cross-sectional view showing the taper hole forming machine of FIG. 38A taken along the line XXXVIIIB-XXXVIIIB.
Figure 38C:
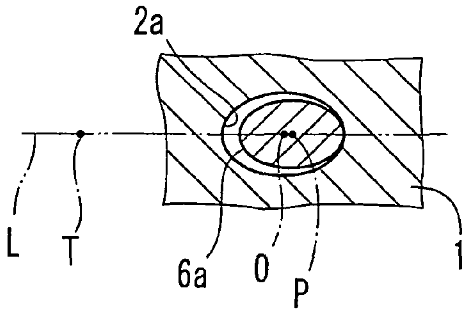
FIG. 38C is a cross-sectional view showing the taper hole forming machine of FIG. 38A taken along the line XXXVIIIC-XXXVIIIC.

Next, an injection hole member 10 according to the eighth embodiment will be explained based on FIGS. 36 to 37C. A concave portion 172 of the injection hole member 10 of the eighth embodiment is formed in a method different from the method for forming the concave portion 38 of the seventh embodiment.

A method for manufacturing the injection hole member 10 according to the eighth embodiment will be explained based on FIGS. 37A to 37C. In FIGS. 37A to 37C, the base material 11 is positioned so that the upstream end surface 11*a* faces downward and the downstream end surface 11*b* faces upward.

First, in a lead hole forming step, a die 220 is set on the downstream end surface 11*b* of the base material 11, as shown in FIG. 37A. The die 220 is formed with a receiving hole 222 in the same inclination angle as the central axis CL122 of the lead hole 14, which is formed by a lead hole punch 200. A hole diameter Dd of the receiving hole 222 is larger than a punch diameter Dp of the lead hole punch 200.

The lead hole 14 is formed by punching out the base material 11 with the lead hole punch 200 so that the central axis CL122 of the lead hole 14 is inclined with respect to the axis L112 of the base material 11 in its thickness direction. The downstream end surface 11*b* of the base material 11 is pressed by the die 220, and the hole diameter Dd of the receiving hole 222 of the die 220 is larger than the punch diameter Dp of the lead hole punch 200. Therefore, the periphery of the downstream end opening of the lead hole 14 is broken, so an enlarged diameter portion 130 is formed.

Then, in an injection hole forming step, a taper punch 202 is inserted into the lead hole 14 from the downstream end side of the lead hole 14 while the taper punch 202 is guided with a guide 210 along the central axis CL122 of the lead hole 14 as shown in FIG. 37B. Thus, the taper punch 202 punches out the base material 11 in a direction opposite to the punching direction of the lead hole punch 200. Thus, the taper punch 202 widens the lead hole 14 and forms the injection hole 34*a*. As shown in FIG. 37C, the taper punch 202 forms the concave portion 172 by remaining the enlarged diameter portion 130 on the first injection hole intersection line L104 side.

In the eighth embodiment, a clearance between the lead hole punch 200 and an internal surface of the receiving cavity 222 is regulated by regulating the hole diameter Dd of the receiving cavity 222. Thus, the size of the enlarged diameter portion 130, or the size of the concave portion 172, can be regulated easily. In the eighth embodiment, a step only for forming the concave portion 172 is unnecessary. Therefore, the production man-hour can be reduced.

In the seventh and eighth embodiments, even if the inclination angle of the central axis CL102 of the injection hole 34*a* varies with respect to the central axis CL100 of the injection hole member 10 or even if the thickness of the injection hole member 10 varies, the spray angle θ can be easily adjusted by regulating the size of the concave portion 38, 172, without changing the injection quantity. In accordance with required performance, the spray angle θ can be easily regulated without changing the inclination angle of the central axis CL102 of the injection hole 34*a*, the thickness of the injection hole member 10 or the injection quantity.

(Modifications)

In the seventh and eighth embodiments, the injection hole member for performing the two-direction injection is explained. Alternatively, the injection hole member for performing one-direction injection may be employed. In the case of the one-direction injection, the injection angles of the respective injection holes can be adjusted by forming the concave portions. Thus, the spreading angle of the entire spray injected from the plurality of injection holes can be regulated easily.

Instead of the taper hole whose diameter increases toward the downstream end opening, a straight hole whose diameter is constant from its upstream end opening to its downstream end opening may be employed. Also in the case of the straight hole, the concave portion is formed on a radially inner side of the edge of the downstream end opening of the injection hole 34*a* with respect to the central axis CL100 of the injection hole member 10. If the central axis CL102 of the injection hole 34*a* is inclined with respect to the central axis CL100 of the injection hole member 10, the inner peripheral surface of the injection hole 34*a* may be formed in any inclination angle with respect to the downstream end surface 11*b* of the injection hole member 10. The number of the injection holes is not limited to four.

The concave portion 38, 172 caving in radially outward from the inner peripheral surface 136 may be formed in any position if the position is in the edge of the downstream end opening of the injection hole 34*a*. The injection direction of the spray can be changed by forming the concave portion in the edge of the downstream end opening of the injection hole 34*a*.

In the above embodiments, the injection hole member 10 of the present invention is used in the injector 100 for the gasoline engine. The injection hole member 10 of the present invention may be used in any application if the fluid is injected from the injection holes 12, 34*a*-34*d*.

The present invention should not be limited to the disclosed embodiments, but may be implemented in many other ways without departing from the spirit of the invention.

What is claimed is:

1. A method for manufacturing an injection hole member formed with an injection hole for injecting fluid, the method comprising:

an injection hole forming step of forming the injection hole so that an axis of the injection hole in an injection direction is inclined with respect to an axis of a base material of the injection hole member in its thickness direction, and a concave portion forming step of forming a concave portion caving in radially outward from an inner peripheral surface providing the injection hole in an edge of a downstream end opening of the injection hole, wherein the injection hole is formed so that one of two injection hole intersection lines between a virtual plane, which includes the axis of the injection hole and is perpendicular to the base material, and the inner peripheral surface of the injection hole provides an acute angle with a downstream end plane of the injection hole and the other injection hole intersection line provides a blunt angle with the downstream end plane of the injection hole, and the concave portion is formed in the edge of the downstream end opening of the injection hole only on a side where the acute angle is provided between the injection hole intersection line and the downstream end plane of the injection hole, said concave portion being formed by applying brush grinding to the edge of the downstream end opening of the injection hole only on the side where the acute angle is provided.

2. The method for manufacturing the injection hole member as in claim 1, wherein the injection hole is a taper hole whose diameter increases toward its downstream end.

3. The method for manufacturing the injection hole member as in claim 1, wherein the concave portion is formed through a grinding process.

4. The method for manufacturing the injection hole member as in claim 1, wherein the injection hole is formed while setting an inclination angle of the axis of the injection hole with respect to the axis of the base material in its thickness direction in the injection hole forming step so that an injection angle of fluid spray injected from the injection hole is larger than a target range in a state before the concave portion is formed, and the injection angle is regulated into the target range by forming the concave portion and decreasing the injection angle in the concave portion forming step.

5. The method for manufacturing the injection hole member as in claim 1, wherein the injection hole member is formed with a plurality of injection holes in the injection hole forming step so that the axes of the injection holes separate from the central axis of the injection hole member, along the injection directions.

6. The method for manufacturing the injection hole member as in claim 2, further comprising:

a lead hole forming step of forming a lead hole before the injection hole is formed so that a central axis of the lead hole is inclined with respect to the axis of the base material in its thickness direction and the lead hole penetrates the base material, wherein the injection hole is formed by inserting a taper punch, whose diameter decreases toward its tip end, into the lead hole from the downstream end of the injection hole and by widening the lead hole in the injection hole forming step.

7. The method for manufacturing the injection hole member as in claim 4, wherein the concave portion forming step includes a measuring step of measuring the injection angle and a processing step of processing the concave portion based on the measured injection angle if the measure injection angle is larger than the target range, and the injection angle is regulated into the target range by repeating the measuring step and the processing step.

8. The method for manufacturing the injection hole member as in claim 5, wherein the spray is injected from the plurality of injection holes in two directions opposite from each other.

* * * * *